United States Patent
Inotsume et al.

(10) Patent No.: US 11,941,994 B2
(45) Date of Patent: Mar. 26, 2024

(54) AREA EVALUATION SYSTEM, METHOD, AND RECORDING MEDIUM

(71) Applicant: NEC CORPORATION, Tokyo (JP)

(72) Inventors: Hiroaki Inotsume, Tokyo (JP); Shinji Nakadai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 700 days.

(21) Appl. No.: 16/976,346

(22) PCT Filed: Feb. 28, 2018

(86) PCT No.: PCT/JP2018/007453
§ 371 (c)(1),
(2) Date: Aug. 27, 2020

(87) PCT Pub. No.: WO2019/167161
PCT Pub. Date: Sep. 6, 2019

(65) Prior Publication Data
US 2021/0142679 A1    May 13, 2021

(51) Int. Cl.
*G08G 5/00* (2006.01)
*B64C 39/02* (2023.01)
*G05D 1/00* (2006.01)
*B64U 101/00* (2023.01)

(52) U.S. Cl.
CPC ........... *G08G 5/006* (2013.01); *B64C 39/024* (2013.01); *G05D 1/104* (2013.01); *G08G 5/0034* (2013.01); *B64U 2101/00* (2023.01); *G08G 5/0069* (2013.01)

(58) Field of Classification Search
CPC .... G08G 5/006; G08G 5/0034; G08G 5/0069; G08G 5/045; G08G 5/0039; B64C 39/024; G05D 1/104; B64U 2101/00; B64U 2201/00
See application file for complete search history.

(56) References Cited

U.S. PATENT DOCUMENTS

| | | | |
|---|---|---|---|
| 6,266,610 B1 * | 7/2001 | Schultz | G06Q 10/047 701/533 |
| 8,566,027 B2 | 10/2013 | Rosswog et al. | |
| 9,508,264 B2 | 11/2016 | Chan et al. | |
| 10,240,926 B1 * | 3/2019 | Herriot | G08G 5/0039 |
| 2003/0093219 A1 | 5/2003 | Schultz et al. | |

FOREIGN PATENT DOCUMENTS

| | | |
|---|---|---|
| JP | 2003-044998 A | 2/2003 |
| JP | 2003-214879 A | 7/2003 |
| JP | 2004-538438 A | 12/2004 |

(Continued)

OTHER PUBLICATIONS

Japanese Office Action for JP Application No. 2020-503155 dated Jan. 25, 2022 with English Translation.

(Continued)

*Primary Examiner* — Shon G Foley

(57) ABSTRACT

Provided is an area evaluation system comprising an area evaluation unit (601) that evaluates, when a first mission that uses a first area and a second mission that does not use the first area are provided, utility of the first area based on a difference between utility of the first mission and utility of the second mission.

14 Claims, 26 Drawing Sheets

(56) References Cited

FOREIGN PATENT DOCUMENTS

| | | |
|---|---|---|
| JP | 2005-504274 A | 2/2005 |
| JP | 2005-122108 A | 5/2005 |
| JP | 2011-058899 A | 3/2011 |
| JP | 2012-174270 A | 9/2012 |
| JP | 2014-032645 A | 2/2014 |
| JP | 2015-205691 A | 11/2015 |
| JP | 2016-075499 A | 5/2016 |

OTHER PUBLICATIONS

International Search Report for PCT/JP2018/007453, dated Apr. 24, 2018.
JP Office Action for JP Application No. 2020-503155, dated Aug. 16, 2022 with English Translation.

* cited by examiner

FIG. 12
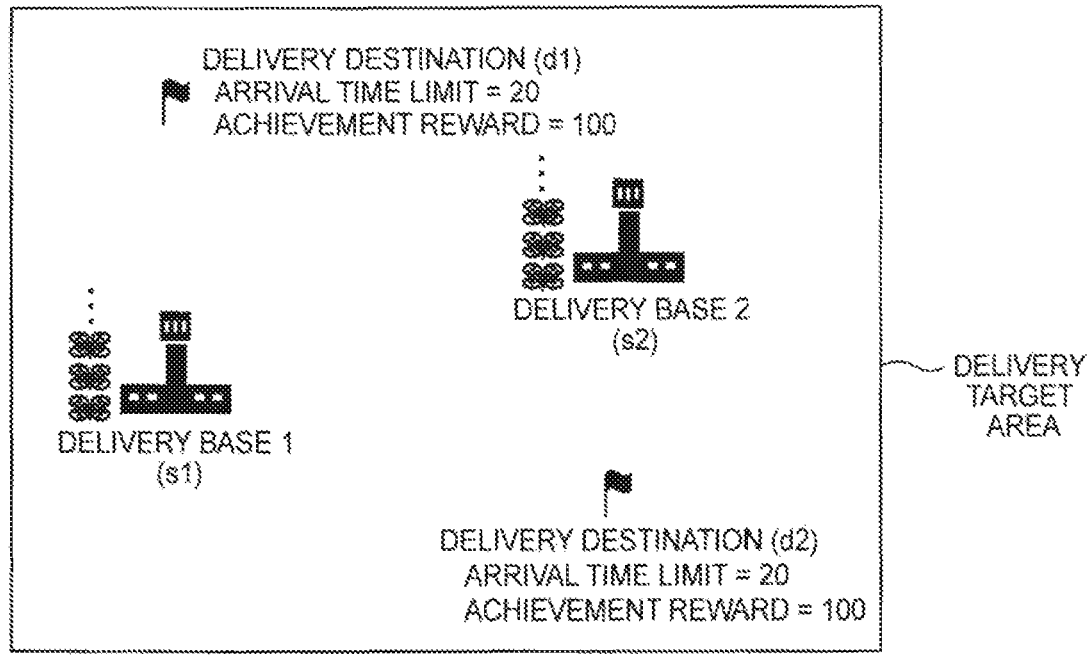
(a)
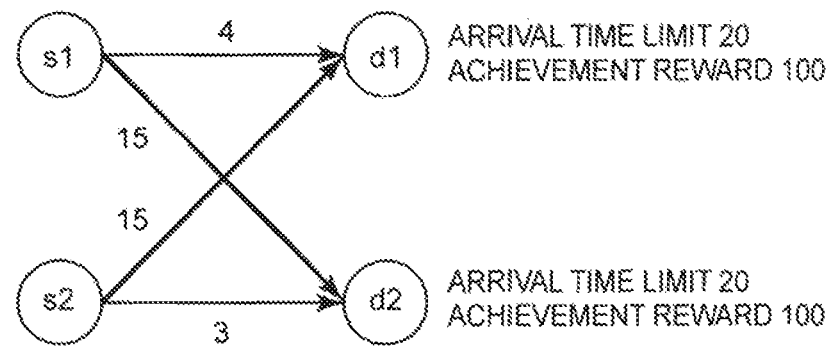
(b)

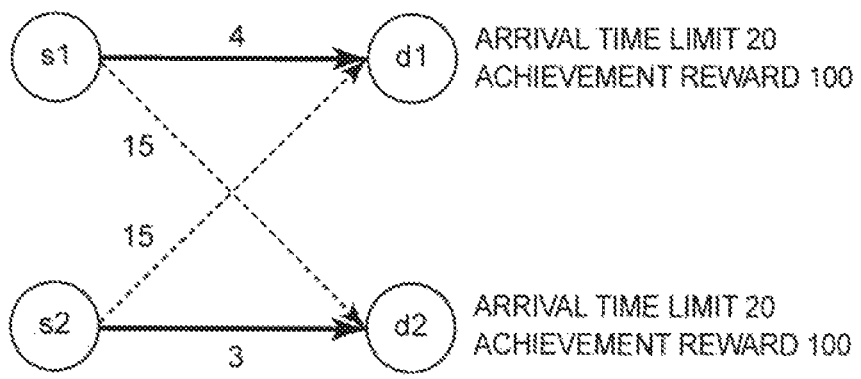
Fig. 14 (a) BEFORE UPDATE  MISSION UTILITY: 193
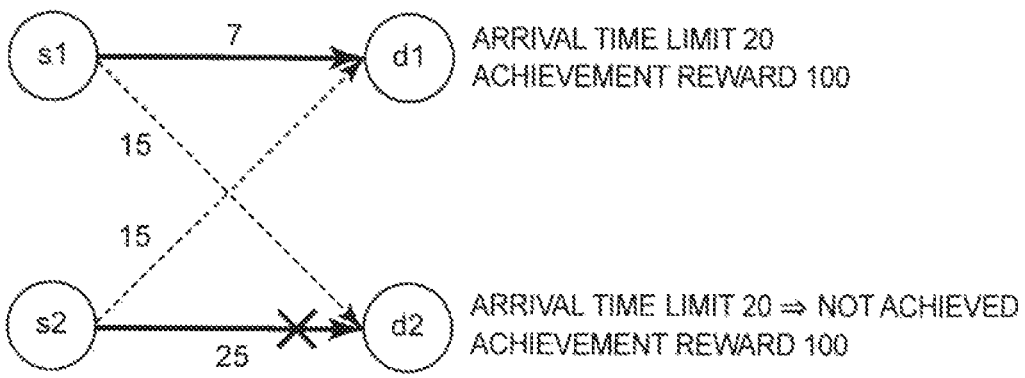
Fig. 14 (b) AFTER UPDATE  MISSION UTILITY: 93
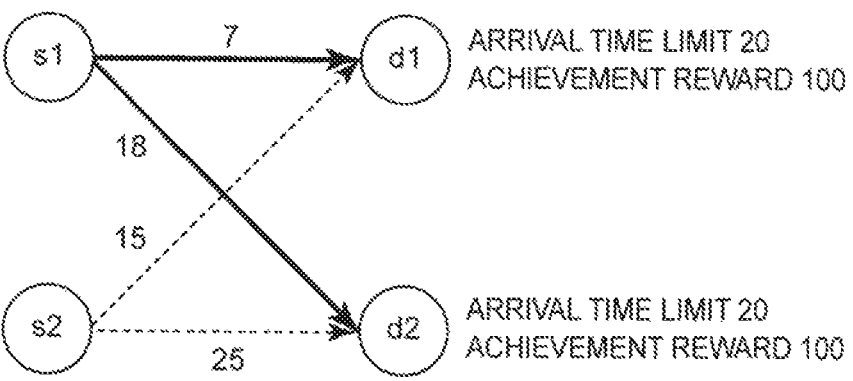
Fig. 14 (c) AFTER REVISION  MISSION UTILITY: 175

FIG. 25
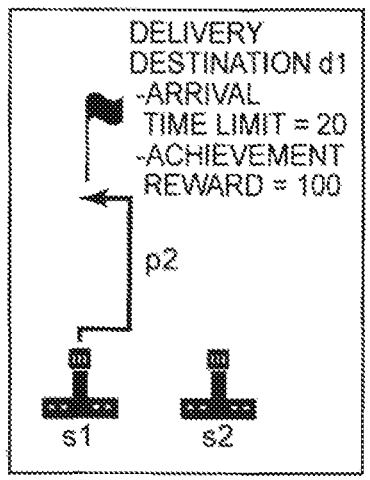
| ASSIGNMENT | PATH | ARRIVAL TIME | PRICE | MOVING COST | MISSION UTILITY |
|---|---|---|---|---|---|
| s1-d1 | p1 | 10 | 15 | 25 | 75 |
| s1-d1 | p2 | 13 | 0 | 13 | 87 |
FIG. 26
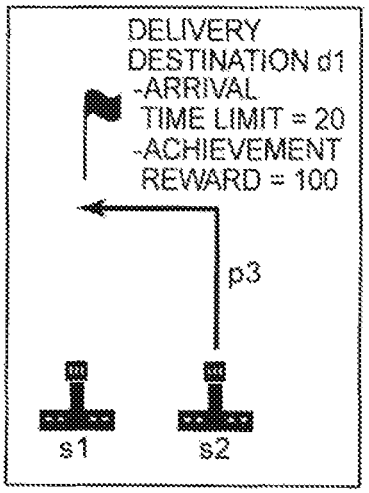
| ASSIGNMENT | PATH | ARRIVAL TIME | PRICE | MOVING COST | MISSION UTILITY |
|---|---|---|---|---|---|
| s1-d1 | p1 | 10 | 15 | 25 | 75 |
| s1-d1 | p2 | 13 | 7 | 20 | 80 |
| s2-d1 | p3 | 18 | 1 | 19 | 81 |

| ASSIGNMENT | PATH | ARRIVAL TIME | PRICE | MOVING COST | REWARD | MISSION UTILITY |
|---|---|---|---|---|---|---|
| s1-d1 | p1 | 10 | — | ∞ | 100 | 0 |
| s1-d1 | p2 | 20 | — | ∞ | 100 | 0 |
| s2-d1 | p3 | 40 | 5 | 45 | 100 | 55 |

FIG. 30
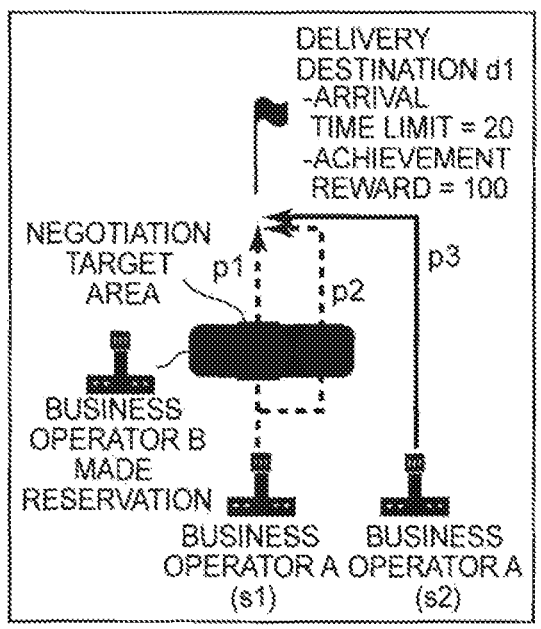
| ASSIGNMENT | PATH | ARRIVAL TIME | PRICE | MOVING COST | REWARD | MISSION UTILITY |
|---|---|---|---|---|---|---|
| s1-d1 | p1 | 10 | x1 | 10+x1 | 100 | 100-(10+x1) |
| s1-d1 | p2 | 20 | x2 | 20+x2 | 100 | 100-(20+x2) |
| s2-d1 | p3 | 40 | 5 | 45 | 100 | 55 |
x1=0 ⇒ UTILITY OF TARGET AREA : 90-55=35 > 0
x1=1 ⇒ UTILITY OF TARGET AREA : 89-55=34 > 0
:
x1=35 ⇒ UTILITY OF TARGET AREA : 55-55=0
x1=40 ⇒ UTILITY OF TARGET AREA : 50-55=-5 < 0
x2=0 ⇒ UTILITY OF TARGET AREA : 80-55=25 > 0
:
x2=3 ⇒ UTILITY OF TARGET AREA : 77-55=22 > 0
x2=28 ⇒ UTILITY OF TARGET AREA : 52-55=-3 < 0

AREA EVALUATION SYSTEM, METHOD, AND RECORDING MEDIUM

CROSS REFERENCE TO RELATED APPLICATIONS

This application is a National Stage of International Application No. PCT/JP2018/007453 filed Feb. 28, 2018.

TECHNICAL FIELD

The present invention relates to an area evaluation system, an area evaluation method, and a recording medium that evaluate an area to be used for operation of a moving body.

BACKGROUND ART

In the future, it is expected that unmanned aircraft vehicles (UAVs), such as drones, are widely used for logistics purposes. However, there is a limit to areas in the sky where UAVs can fly safely, and business operators or traffic management systems that manage operation of UAVs need a system for reserving or providing paths and operation areas for UAVs to fly safely. This is not limited to UAVs, and the same applies to the case of managing operation of moving bodies.

As a method for avoiding conflicts between moving bodies, a traffic management system that manages moving-body operation plans of one or more business operators is provided and confirms, in order to approve an operation plan, that an area to be used in the moving-body operation plan applied for is not overlapped with another approved operation plan.

At this time, if the area is to be used by the same business operator, the traffic management system may approve both operation plans and the business operator may perform control to avoid collision of the moving bodies of the business operator. Alternatively, if one business operator has different instruction systems for instructing the moving bodies to perform actual operation, the traffic management system can regard them as other business operators to perform exclusive control. In the following, an "instruction system for moving-body operation" to which an area is exclusively assigned is referred to as a "business operator".

In the present invention, an "area" is defined as a space and time each having a certain width. That is, if spaces are different, they are regarded as different areas, and if time zones are different in the same space, they are regarded as different areas.

On the assumption that such a traffic management system is used, depending on the assignment of an area included in an operation plan to another business operator, each business operator is required to revise the moving-body operation plan (re-plan a path or the like) or to negotiate the area between the business operators.

As a technique related to revising a moving-body operation plan and re-planning a moving path, for example, Patent Literature 1 discloses that enemy force movement or threat (other moving bodies in this specification) is predicted to re-plan an own path plan (route) in a manner such that the chance of a lethal encounter is reduced or eliminated.

In addition, Patent Literature 2 discloses an example of a mission manager module that performs processing and decision-making in an autonomous vehicle while monitoring components in an autonomous vehicle system platform and performing adjustment between other components.

In addition, Patent Literature 3 discloses an order management system that plans the physical movement of empty resources and determines the best way to execute an order in terms of reliability, profitability, and service level agreement while securing, based on an optimal asset assignment policy, the availability of the empty resources on the due date. The order management system disclosed in Patent Literature 3 re-processes an order or its components based on the acceptance of a setting option from a customer.

CITATION LIST

Patent Literature

PTL 1: U.S. Pat. No. 8,566,027
PTL 2: Japanese Patent Application Laid-Open No. 2015-205691
PTL 3: Japanese Patent Application Laid-Open No. 2014-032645

SUMMARY OF INVENTION

Technical Problem

If there is interaction with other business operators for an area to be used for operation, for example, if an area to be used for movement needs to be shared or competed for with other business operators, it is necessary not to make a disadvantageous selection. Here, a "selection" is, for example, a mission selection, a selection related to acquisition of an area (whether the area is to be acquired or not), a selection related to release of an area (whether the area is to be released), and the like. In order not to make a disadvantageous selection, it is important to appropriately evaluate mission content, a path of each moving body included therein, and the area to be used for the path. In particular, it is important to evaluate the area at a mission level.

In the present invention, a mission is defined as "what is executable for one or more tasks (a group of specific plans) managed by the business operator", more specifically, "a group of operation plans obtained by assigning resources (moving body resources, area resources, and the like) in a manner such that each of one or more tasks managed by the business operator is executable. Here, a task is a task involving operation of a moving body and includes at least designation of a space and time. Note that, a group of operation plans obtained by assigning moving body resources to a task and determining a path for each assigned moving body resource is an example of a mission.

Here, the designation of a space in a task is only required to specify the destination point or the target range of operation. Examples of the destination point of operation include one or more points including a goal (may include a start point and a relay point). Examples of the target range include an operation target space in operation for a monitoring purpose (a space to be monitored) and the like. The designation of time in an operation task is only required to specify the completion time of the operation (time limit for reaching the goal) and/or the time required for the operation. In other words, the task is a task related to moving-body operation indicated by at least information on the space specifying the destination point or the target range of the operation and information on the time specifying the completion time or the required time of the operation. Note that, the task may include designation of economic or business utility provided by the execution of the task. Here, the economic or business utility can be read as "reward," "budget," "importance," or the like.

For example, it is assumed that an operation plan is applied for to a traffic management system that performs exclusive control of an area with another business operator or that the usage right of an area is transferred in negotiation with another business operator. In such a case, it is necessary to select mission content after appropriately evaluating the mission content, a path of each moving body included therein, and the area to be used for the path so as not to be disadvantageous. In addition, if an area to be used in planned mission content is evaluated and using the area is disadvantageous, it is necessary to return to planning the mission to determine a more appropriate mission, that is, to re-plan the mission.

In this manner, in order not to make a disadvantageous selection when there is interaction related to at least an area with another business operator, it is necessary to consider the utility at the mission level, more specifically, paths for all tasks included in the mission and the utility based thereon to evaluate the area. However, Patent Literatures 1 to 3 do not consider the point of evaluating an area from such a viewpoint.

For example, only with the evaluation or modification at the moving-body operation plan (pass plan) level for simply avoiding a collision as disclosed in Patent Literature 1, it is not possible to perform optimization at the mission level, and this can lead a disadvantageous selection. This is because the determination index for an operation plan in Patent Literature 1 has an exclusion condition for collision prevention but does not have concept of evaluation (value determination or the like) of an area, and the utility of the task using the area is not evaluated appropriately.

In addition, Patent Literatures 2 and 3 do not consider evaluation of an area based on the utility of its own mission (business value, economic value, and the like) in an environment where there is interaction with another business operator.

For example, it is assumed that, in an environment where there is a plurality of business operators (economic agents) having different purposes, payment is required when an area is reserved through an auction, negotiation, application to a management system, or the like. In such a case, a business operator is required to properly evaluate whether it is effective for its own mission to pay a certain amount of money to reserve the area (whether the utility of the mission level is increased compared to another mission content). For example, depending on the result of the area evaluation, by re-planning the mission to change the delivery base (start position) of the moving body, the utility of the mission level can be increased. In addition, for example, by appropriately evaluating the utility of the area at the mission level, it is possible to perform a non-disadvantageous negotiation (presentation of the price or the like) for the area with another business operator.

In view of the above problems, a purpose of the present invention is to provide an area evaluation system, an area evaluation method, and a recording medium that are capable of appropriately evaluating an area for a business operator when there is interaction with another business operator for the area to be used for operation.

Solution to Problem

An area evaluation system according to the present invention includes an area evaluation unit that evaluates, when a first mission that uses a first area and a second mission that does not use the first area are provided, utility of the first area based on a difference between utility of the first mission and utility of the second mission.

An area evaluation method according to the present invention includes evaluating by an information processing device, when a first mission that uses a first area and a second mission that does not use the first area are provided, utility of the first area on a difference between utility of the first mission and utility of the second mission.

A computer-readable recording medium according to the present invention stores an area evaluation program for causing a computer to evaluate, when a first mission that uses a first area and a second mission that does not use the first area are provided, utility of the first area based on a difference between utility of the first mission and utility of the second mission.

Advantageous Effects of Invention

According to the present invention, it is possible to appropriately evaluate an area for a business operator when there is interaction with another business operator for the area to be used for operation.

BRIEF DESCRIPTION OF DRAWINGS

FIG. 12 It depicts an explanatory diagram showing an example of a graph created by the MP 10A.

FIGS. 14(a)-14(c) It depicts an explanatory diagram showing an example of a graph updated by the MP 10A.

FIG. 25 It depicts an explanatory diagram (2) showing an example of revising an optimal mission during an auction.

FIG. 26 It depicts an explanatory diagram (3) showing an example of revising an optimal mission during an auction.

FIG. 30 It depicts an explanatory diagram showing an evaluation example of the utility of an area during negotiation.

DESCRIPTION OF EMBODIMENTS

First Exemplary Embodiment

Figure 1:
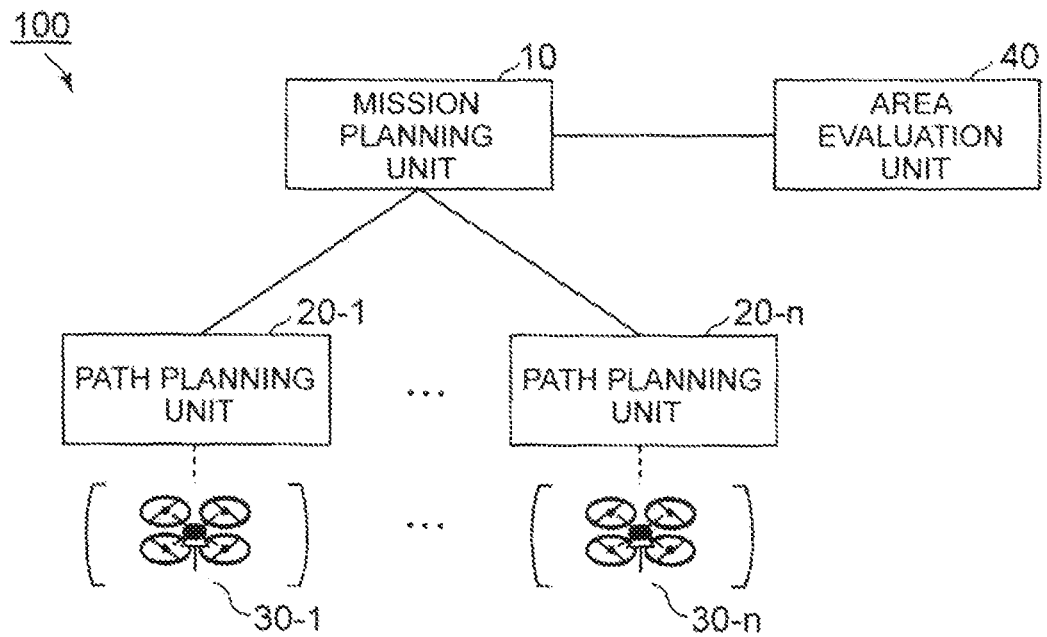
FIG. 1 It depicts a configuration diagram showing a configuration example of an area evaluation system in a first exemplary embodiment.
Figure 2:
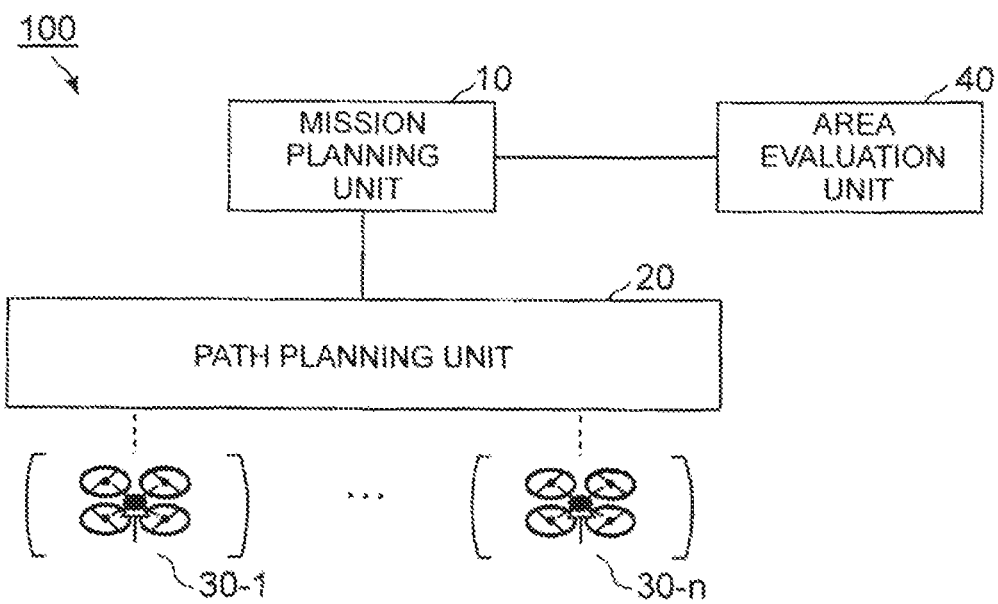
FIG. 2 It depicts a configuration diagram showing a configuration example of the area evaluation system in the first exemplary embodiment.

Hereinafter, an exemplary embodiment of the present invention will be described with reference to the drawings. FIGS. 1 and 2 are configuration diagrams showing configuration examples of an area evaluation system in a first exemplary embodiment of the present invention. As shown in FIGS. 1 and 2, an area evaluation system 100 in the present exemplary embodiment includes a mission planning unit 10 and one or more path planning units 20 (20-1 to 20-n).

Note that, FIG. 1 is a configuration example of a distributed system in which one path planning unit 20 is associated with one moving body 30 on a one-to-one basis, and FIG. 2 is a configuration example of a centralized system in which one path planning unit 20 is associated with all the moving bodies managed by a business operator (hereinafter, can be referred to as an own business operator) who is a user of the area evaluation system 100. Note that, the path planning unit 20 is not necessarily associated with the moving body 30 on a one-to-one basis or one-to-all basis and is only required to be associated with one or more moving bodies 30 managed by the own business operator.

When a task involving operation and including the designation of a space and time is provided, the mission planning unit 10 plans (generates) one or more missions for one or more previously-provided tasks. In the following, one or more tasks for which a mission is to be generated can be collectively referred to as target tasks.

The mission planning unit 10 may generates a mission by, for example, assigning one or more moving body resources to each target task or a combination thereof and assigning specific operation plans to the moving body resources. The mission planning unit 10 may generate a primary mission by, for example, assigning one or more moving body resources (however, no specific path is designated) in a manner such that each target task can be executed. Here, the assignment of the moving body resources in the primary mission includes the designation of an operation condition required for the path planning unit 20 to derive an optimal path. As an example, the mission planning unit 10 may generate the primary mission by performing the assignment of the moving body resources each include at least one designation of a start point, a start time, one or more points including a target range or a goal point, an allowable time until completion of execution, and an operation executable area. Then, a secondary mission is generated by causing the path planning unit 20 to derive an optimal path (path) for the generated primary mission. Here, the secondary mission is a mission in which a more specific path is designated for each moving body resource assigned in the primary mission. Thereafter, the mission planning unit 10 may generate an optimal mission by selecting, from the generated secondary mission, a mission whose utility (mission utility) has an optimal value.

Note that, the process for generating the optimal mission may include a procedure for reserving and evaluating an area to be used for the path, as to be described later. In the following, a secondary mission including an unreserved area in at least a part of a path and a secondary mission reserving all the areas of an operation plan are simply referred to as a "mission" without distinction.

When the primary mission is provided, the path planning units 20 each plan (derive) an optimal path for the provided primary mission.

For example, the mission planning unit 10 may calculate a mission utility $u(m_i)$ of a mission $m_i$ using the following expression (1).

$$u(m_i) = r(m_i) - c(m_i) \quad (1)$$

Here, $r(m_i)$ represents the mission reward of $m_i$ and $c(m_i)$ represents the mission cost of $m_i$. Each can be calculated as follows using a reward $r_j$ of a task j and a moving cost $c_j$ of the moving body assigned to the task. The method of calculating the mission utility u is not limited thereto. For example, the mission utility u is only required to be calculated using the utility of a target task (the utility based on the reward and the moving cost of the moving body). In the following expression (3), one moving body is assigned to one task as an example. However, two moving bodies can be assigned to one task (that is, two moving bodies perform operations by dividing one target range of the task, or the like), or one moving body can be assigned to two or more tasks (that is, one moving body relays one of the destination points of two tasks, or the like). In this case, by regarding the operation of one moving body as one task (pseudo-task), the moving body can be assigned to the task on a one-to-one basis. In this case, the pseudo task is only required to appropriately process and take over the information on the original target task. An example of the processing includes adding/dividing a reward, setting a goal point or relay point, or the like.

$$r(m_i)=\Sigma r_j \quad (2)$$

$$c(m_i)=\Sigma c_j \quad (3)$$

Here, the moving cost may be an evaluation value of a path when the moving body moves from a start (departure position) to a goal (arrival position) along the path. The lower the moving cost is, the more preferable the path is. In addition, a path for moving to an arrival position at a lowest moving cost under a condition can be referred to as an optimal path or an optimal solution under the condition. Note that, the number of paths for which the moving cost is calculated is not limited to one. For example, by setting a plurality of paths, the moving cost based on each path can be calculated.

In order to calculate the moving cost, a cost function can be used, for example. The cost function is a calculation expression for calculating a moving cost required for a designated path. Here, the cost function can include, as elements, a moving distance, a moving time, energy consumption, a distance to an obstacle at each point on the path, and the like. Note that, the cost function may be defined by combining a plurality of elements from these elements, that is, the cost function may be a weighted sum of "a moving distance" and "a distance to an obstacle". The optimal solution of path searching differs depending on the definition of the cost function.

In addition, in the present exemplary embodiment, the "utility" of a mission, a task, or an area is defined as a value indicating how much "profitable" or "loss". As an example, the utility of the area for a mission, which is planned for a task provided to a business operator, is a value indicating how much "profit" or "loss" the area is in a problem in which all the provided tasks are satisfied by all the operation plans included in the mission reaching the goal from the start. For example, the utility of an area becomes a positive value (maximum value) if all the operation plans reach the goal at a lower moving cost and all the provided tasks are achieved by using the area, and becomes a negative value if some operation plans reach the goal at a higher moving cost or if some tasks cannot be achieved. At this time, the details of the moving cost of each path can include not only the moving cost of the moving body to move along the path, but also the cost for reserving the area to be used for the path (a path price to be described later).

When an arbitrary $m_1$ that uses a certain area R and an arbitrary $m_2$ that does not use the area R are provided, an area evaluation unit 40 evaluates, based on such mission utility u, the utility f(R) of the area R from the difference between the utility $u(m_1)$ and the utility $u(m_2)$ of these different missions m.

The area evaluation unit 40 may evaluate, in two missions included in two or more missions, which are generated by the mission planning unit 10, for which the path planning unit 20 derives paths, the utility of at least a part of the area that is used in one mission but is not used in the other mission, based on the difference between the utility of the mission $m_1$, which is the one mission, and the utility of the mission $m_2$, which is the other mission.

Incidentally, each of $m_1$ and $m_2$ may be a mission whose mission utility has an optimal value among the missions generated under the condition of generating the mission (see, expression (3)). As an example, $m_1$ and $m_2$ may be, when one or more tasks are provided, a mission whose mission utility has an optimal value among the missions generated under the condition that the area R is available and a mission whose mission utility has an optimal value among the missions generated under the condition that the area R is not available, respectively. These each may be a mission whose utility u has an optimal value before and after revision of the mission when the availability of the area R can change.

$$m^*=\arg\max_m u(m) \quad (3)$$

Here, m represents any element that can be generated or included in a set of generated missions when one or more tasks are provided to a business operator. Note that, m* represents a mission whose utility has an optimal value in the set.

In addition, each of $m_1$ and $m_2$ may be a mission derived, for one or more tasks, by the mission planning unit 10 and the path planning unit 20 in a manner such that the mission utility u has an optimal value. More specifically, each of $m_1$ and $m_2$ may be a mission derived, for one or more tasks provided in the mission, in a manner such that the utility has an optimal value based on a result of assigning one or more moving body resources and a result of deriving a path for each moving body resource indicated by the assignment result. At this time, the result of deriving the path may be expressed as follows (see Expression (4)).

$$p^*=\arg\min_p c(p) \quad (4)$$

Here, p represents any element that can be derived or included in a set of derived paths for a moving body resource assigned to the target task of the business operator. Note that, p* represents a path whose cost has the smallest value in the set (optimal path). Note that, c(p) represents the cost of the path p and is calculated using, for example, the following expression (5). For example, the mission cost c(m) represented by the sum of the moving costs of the tasks may be regarded as the sum of the costs of the optimal paths derived for all the moving body resources assigned to the target task.

$$c(p)=\text{arrival time of } p + \text{actual cost of } p \quad (5)$$

Here, the arrival time of p represents the time required for the moving body to move along the path. In addition, the actual cost of p may be determined based on the moving cost of the moving body to move along the path and the cost for reserving the area to be used for the path (path price and the like).

This means that the optimal path is not derived, for a set of paths assigned to one or more tasks in which a start and a goal are determined, by considering only the length of each path (arrival time) but derived by including the moving cost of the moving body to move along each path, the cost of the areas, and the like. In addition, the derivation of the optimal path and the calculation of the cost mean that the moving cost of the moving body to move along the path and the cost of the area, in addition to the length of the path (path) to be used in the mission or a mission to be compared with, are reflected in the utility u(m) of the final mission and the utility f(r) of the area calculated based on the utility u(m).

Note that, in each of $m_1$ and $m_2$, the utility u does not necessarily have an optimal value. That is, the two missions $m_1$ and $m_2$ used when the utility f(R) of the area R is evaluated are only required to be missions that have different usage states of the area R (that is, the area R is divided into used or unused state) and that the utility u of each can be calculated at the time of evaluation.

Figure 3:
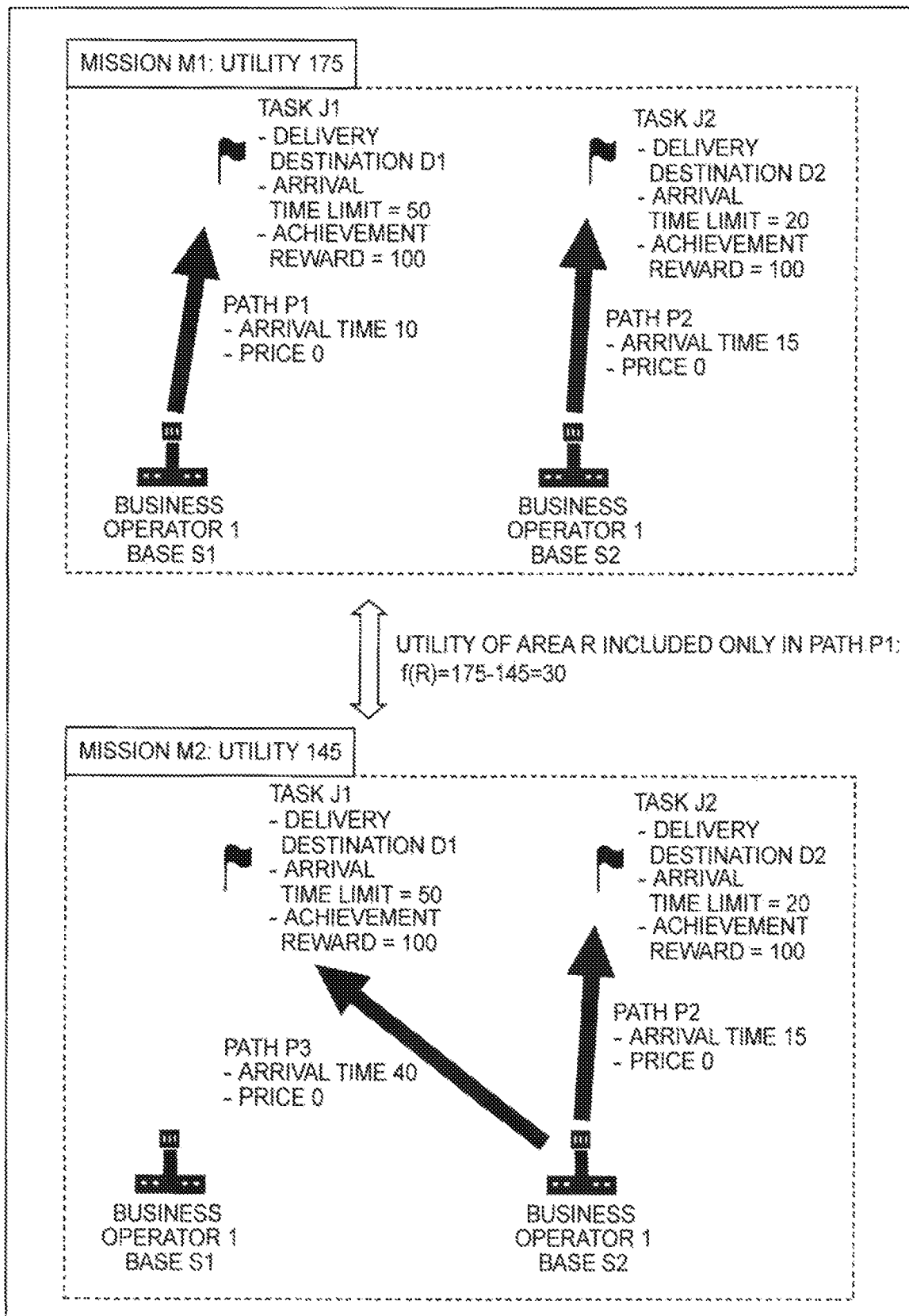
FIG. 3 It depicts an explanatory diagram showing an example of a calculation result of utility f(R) of an area R.

FIG. 3 is an explanatory diagram showing an example of a calculation result of the utility f(R) of the area R. In this example, it is assumed that two missions (M1 and M2) are generated for two target tasks. The parameters (target tasks, assignment of moving bodies, moving costs of the assigned moving bodies, and the like) used for generating the missions and each calculated mission utility are as follows.

1. Mission M1
   A. Task assignment
      Task J1 (delivery destination D1): base S1 (moving body 30-1 at base S1)
      Task J2 (delivery destination D2): base S2 (moving body 30-2 at base S1)
   B. Reward r(m)
      Task J1: 100
      Task J2: 100
      Total Σr(j): 100+100=200
   C. Moving cost c(j): arrival time of p+cost of p
      Task J1 (path P1): 10+0=10
      Task J2 (path P2): 15+0=15
      Total Σ/c(j): 10+15=25
   D. Mission utility u(m): Σr(j)−Σc(j)
      Mission M1: 200−25=175
2. Mission M2
   A. Task assignment
      Task J1 (delivery destination D1): base S2 (moving body 30-3 at base S2)
      Task J2 (delivery destination D2): base S2 (moving body 30-2 at base S1)
   B. Reward r(m)
      Task J1: 100
      Task J2: 100
      Total Σr(j): 100+100=200
   C. Moving cost c(j): arrival time of p+cost of p
      Task J1 (path P3): 40+0=40
      Task J2 (path P2): 15+0=15
      Total Σc(j): 40+15=55
   D. Mission utility u(m): Σr(j)−Σc(j)
      Mission M2: 200−55=145

With the above, for example, the utility f(R) of the area R used by the mission M1 and not used by the mission M2 (in this example, the area used for the path P3) may be calculated, based on the utility u(M1) of the mission M1 and the utility u(M2) of the mission M2, as f(R)=u(M1)−u(M2)=175−145=30.

Figure 4:
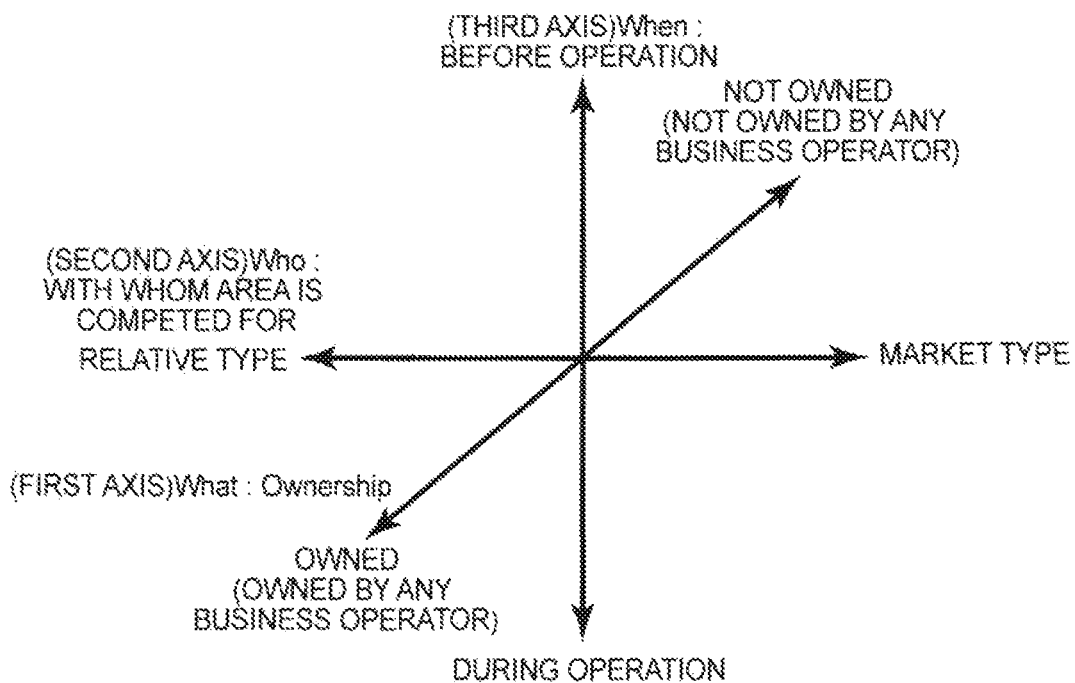
FIG. 4 It depicts an explanatory diagram showing an example of the area R.

Examples of the area R to be evaluated include the following. FIG. 4 is an explanatory diagram showing an example of the area R to be evaluated. Note that, FIG. 4 shows an example of the area R from three viewpoints ("What", "Who", and "When"). That is, the area R to be evaluated may be an area before operation or an area during operation. In addition, the area R may be an area owned (the usage right is reserved) by any business operator or an area not owned (the usage right is not reserved) by any business operator. In addition, the area R may be a market type, that is, an area to be exchanged by (the area is transferred to) an unspecified business operator or a bilateral type, that is, an area to be exchanged by (the area is transferred to) a specified business operator. Note that, these can be appropriately combined.

Examples of the "market type" include an auction in which exchanges are conducted in accordance with the market principle and an approval system in which exchanges are conducted based on a predetermined condition, that is exchanges are conducted in the order of applications to the administrator, in the priority order of application content, or the like. Examples of the "bilateral type" include one-to-one negotiation and the like.

In addition, as an example of the area "before operation", the area R may be an area to be used for an operation plan included in a mission at the planning stage of the mission of a business operator (or any business operator) who evaluates the area. In addition, as an example of the area "during operation", the area R may be an area to be used for any operation plan included in a mission of the business operator (or any business operator) while the moving body is executing the operation plan. In some cases, the area before operation for a business operator may be the area during operation for another business operator, but it is assumed that the area is referred to as the state of the area for the business operator who evaluates the area.

As a further example, the area R may be an area whose usage state is different between $m_1$ and $m_2$ (more specifically, operation plans included therein) before operation or an area whose usage state is different during operation of at least one of $m_1$ and $m_2$. The area R may be an area whose usage state is different or to be different due to the transfer (assignment or acquisition) of the usage right directly performed with a specified business operator based on negotiation or the like. The area R may be an area whose usage state is different or to be different due to the transfer of the usage right performed based on the market principle, such as auction. The area R may be an area owned by a specified person (or a business operator) or may be an area not owned by any business operator. Naturally, these can also be appropriately combined.

In any case, the utility of the area to be used for operation (including not only the case of being used by the own business operator but also the case of being used by another business operator by being not used by the own business operator) can be appropriately evaluated according to the designated mission, and it is possible to prevent the own business operator from making a disadvantageous choice in reserving or transferring the area.

In the above example, the mission is generated sharedly by the mission planning unit 10 and the path planning unit 20. However, one planning unit (for example, the mission planning unit 10) may generate the primary mission and further generate a mission (secondary mission) by deriving an optimal path (a path and the moving thereof) for the generated primary mission. In other words, it is only required to assign moving body resources under a designated operation condition to a provided task and to generate a mission by deriving a path for each assigned moving body resource, and the number of processing units performing the above is not particularly limited.

Second Exemplary Embodiment

Next, as an example, the area evaluation system is applied to a UAV traffic management system (UTMS) that manages areas to be used for operation of moving bodies and operation plans of the moving bodies (performs application acceptance, approval, conflict control, and the like).

Figure 5:
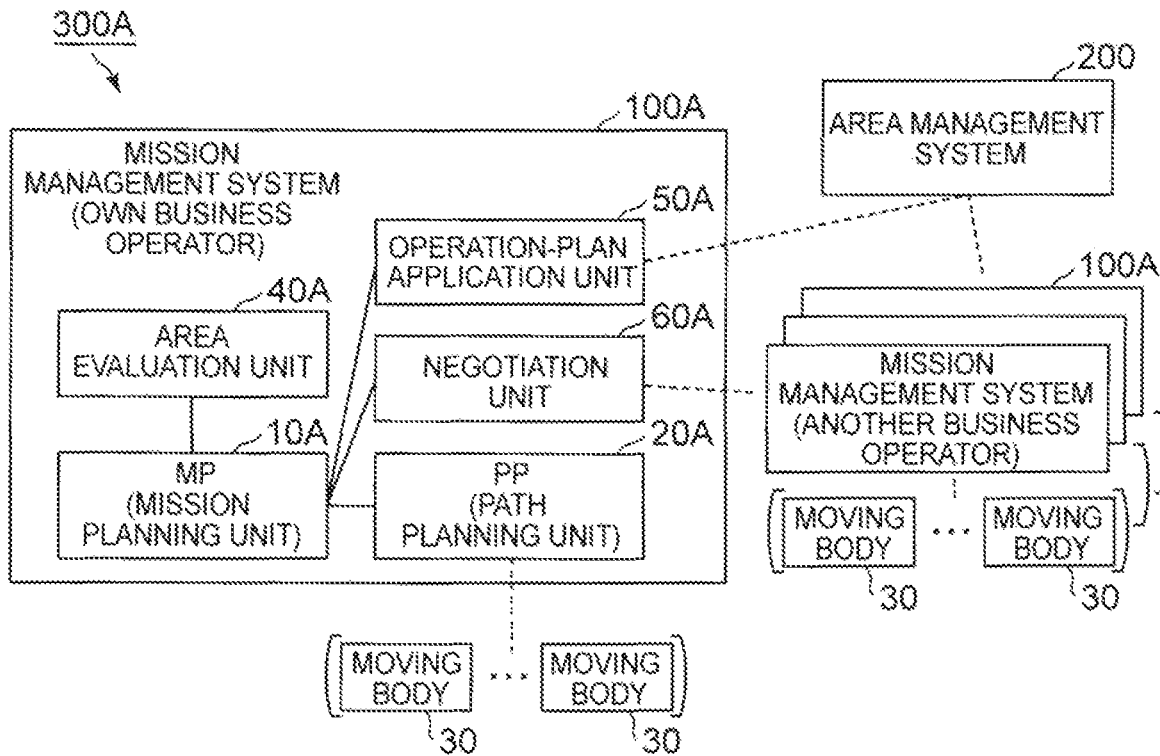
FIG. 5 It depicts a schematic configuration diagram of a UAV traffic management system in a second exemplary embodiment.
Figure 6:
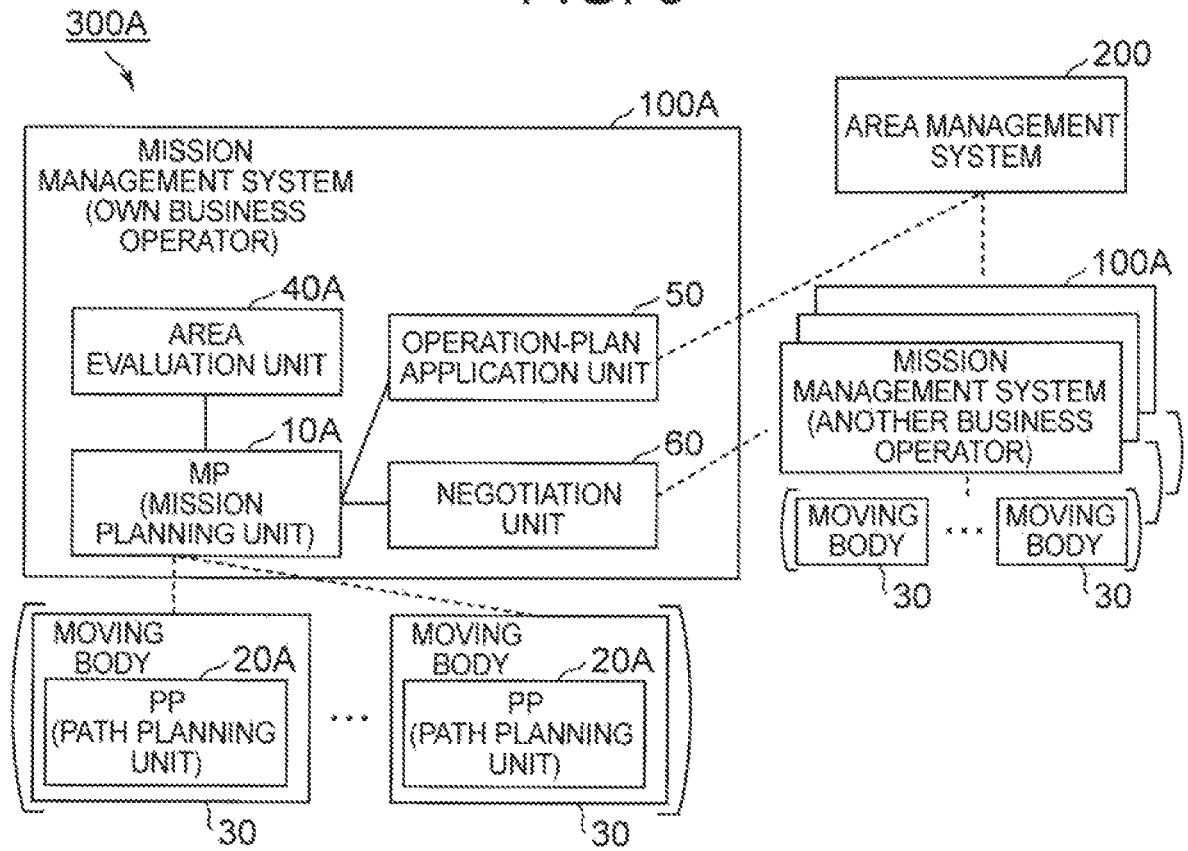
FIG. 6 It depicts a schematic configuration diagram of the UAV traffic management system in the second exemplary embodiment.

FIGS. 5 and 6 are configuration diagrams showing a schematic configuration of a UAV traffic management system in a second exemplary embodiment of the present invention and a configuration example of a mission management system as the area evaluation system included in the mission management system.

The UAV traffic management system 300A shown in FIGS. 5 and 6 includes an area management system 200 and one or more mission management systems 100A. In this example, the mission management systems 100A are associated with business operators who perform various businesses by operating moving bodies on a one-to-one basis. In addition, each mission management system 100A is communicatively connected to one or more moving bodies 30 managed by the business operator.

The area management system 200 manages areas to be used for operation of the moving bodies (moving bodies used by a plurality of business operators for their respective businesses). For example, the area management system 200 receives an application for an area or an application for a moving-body operation plan from each business operator (the mission management system 100A associated with each business operator), assigns the received area or the area to be used for the received operation plan to the business operator, and approves the operation plan by confirming the usage right of the area to be used for the received operation plan. In this example, it is assumed that the area to be used for operation of a moving body is exclusively assigned at least among the business operators. Note that, the area to be used for operation of a moving body may be exclusively assigned among the moving bodies.

The mission management system 100A is a system that manages a business involving at least operation of a moving body of the own business operator. The mission management system 100A as the area evaluation system 100 in this example further includes a mission planner (MP) 10A, a path Planner (PP) 20A, an area evaluation unit 40A, an operation-plan application unit 50A, and a negotiation unit 60A. The MP 10A corresponds to the mission planning unit 10, the PP 20A corresponds to the path planning unit 20, and the area evaluation unit 40A corresponds to the area evaluation unit 40.

Note that, the example shown in FIG. 5 is a configuration example of the mission management system as a centralized area evaluation system in which one PP 20A generates paths for all the moving bodies 30 managed by the business operator. Although FIG. 5 shows a configuration in which each mission management system 100A includes one PP 20A that generates paths for all the moving bodies 30 managed by the own business operator (the business operator associated with the mission management system 100A), the PP 20A may be provided in another system.

The example shown in FIG. 6 is a configuration example of the mission management system as a distributed area evaluation system (see FIG. 1) in which an individual PP 20A is provided for each moving body. Although FIG. 6 shows a configuration in which each moving body 30 includes the PP 20A that generates a path for itself, the mission management system 100A may have a configuration including a plurality of PPs 20A corresponding to a plurality of moving bodies 30 managed by the own business operator.

In the UAV traffic management system 300A, the PP 20A may not be necessarily provided for each business operator or each moving body and is only required to be communicatively connected to one or more PPs 20A designated as the path generation destination of the moving bodies 30 managed by the MP 10A of each business operator.

The operation-plan application unit 50A applies, based on a mission generated by the MP 10A (for example, an optimal mission), to the area management system 200 for an operation plan of a moving body 30 of the own business operator. When, for example, a mission is provided, the operation-plan application unit 50A may apply to the area management system 200 for an operation plan of one or more moving bodies included in the mission. At this time, the operation-plan application unit 50A may regard the one or more moving body resources included in the mission and the paths derived for them as the moving bodies 30 corresponding to the moving body resources and the paths thereof to generate an operation plan for application and apply for it.

In addition, the operation-plan application unit 50A is capable of applying to the area management system 200 for, together with the operation plan, the area to be used for the operation plan. At this time, the operation-plan application unit 50A may set a price for the area to be reserved to apply.

The negotiation unit 60A negotiates the price with another business operator when the usage right of the area to be used for the operation.

Figure 7:
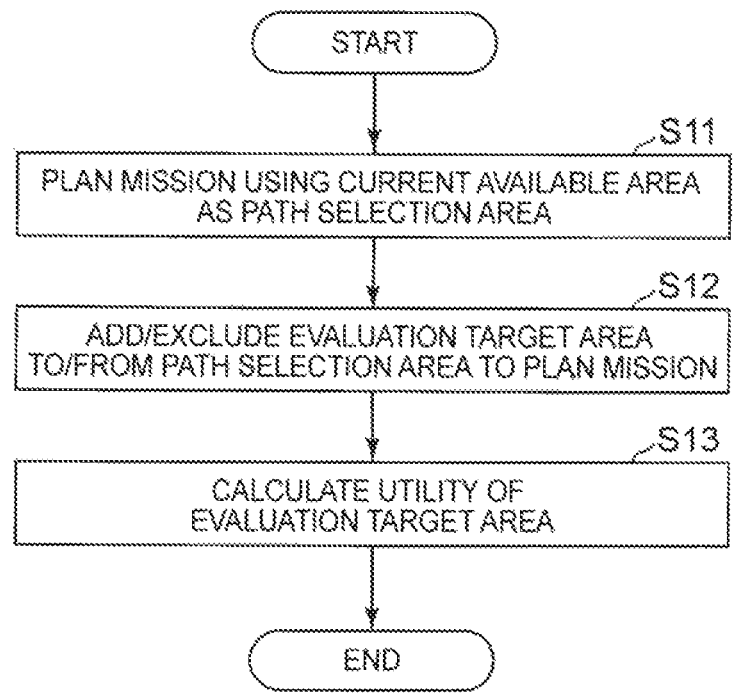
FIG. 7 It depicts a flowchart showing an operation example in area evaluation of a mission management system 100A in the second exemplary embodiment.

Next, the operation of the UAV traffic management system 300A in the present exemplary embodiment will be described. In the following, in particular, the operation related to area evaluation performed by the mission management system 100A of the UAV traffic management system 300A will be described. FIG. 7 is a flowchart showing an operation example of area evaluation of the mission management system 100A in the present exemplary embodiment.

In the example shown in FIG. 7, the MP 10A firstly plans (generates) a mission for one or more provided target tasks, using the current available areas as path selection areas (step S11). At this time, the MP 10A may plan the mission using the PP 20A similarly to the first exemplary embodiment.

Here, the available areas are areas that can be currently used by the business operator (for example, areas assigned to the own business operator or areas not occupied by anyone to perform operations). The path selection areas are areas that can be selected as areas through which a path passes when the PP 20A derives the path. In other words, the PP 20A cannot derive a path passing through areas other than the path selection areas.

Then, the MP 10A adds an evaluation target area (area R), which is an area whose utility is to be evaluated, to the path selection areas or excludes the evaluation target area from the path selection areas to plan a mission for the one or more provided target tasks (step S12). The method for generating the mission may be similar to step S11.

Then, the area evaluation unit 40A calculates the utility f(R) of the evaluation target area (step S13). The method of calculating the utility of the target area may be similar to that in the first exemplary embodiment. That is, the area evaluation unit 40A may perform evaluation based on the difference between the mission utility by using the evaluation target area (the utility of the mission generated in step S11) and the mission utility without using the evaluation target area (the utility of the mission generated in step S12).

In the above operation example, the execution order of steps S11 and S12 may be reversed. Alternatively, steps S11 and S12 may be executed in parallel, or two missions can be simultaneously generated in one process.

Figure 8:
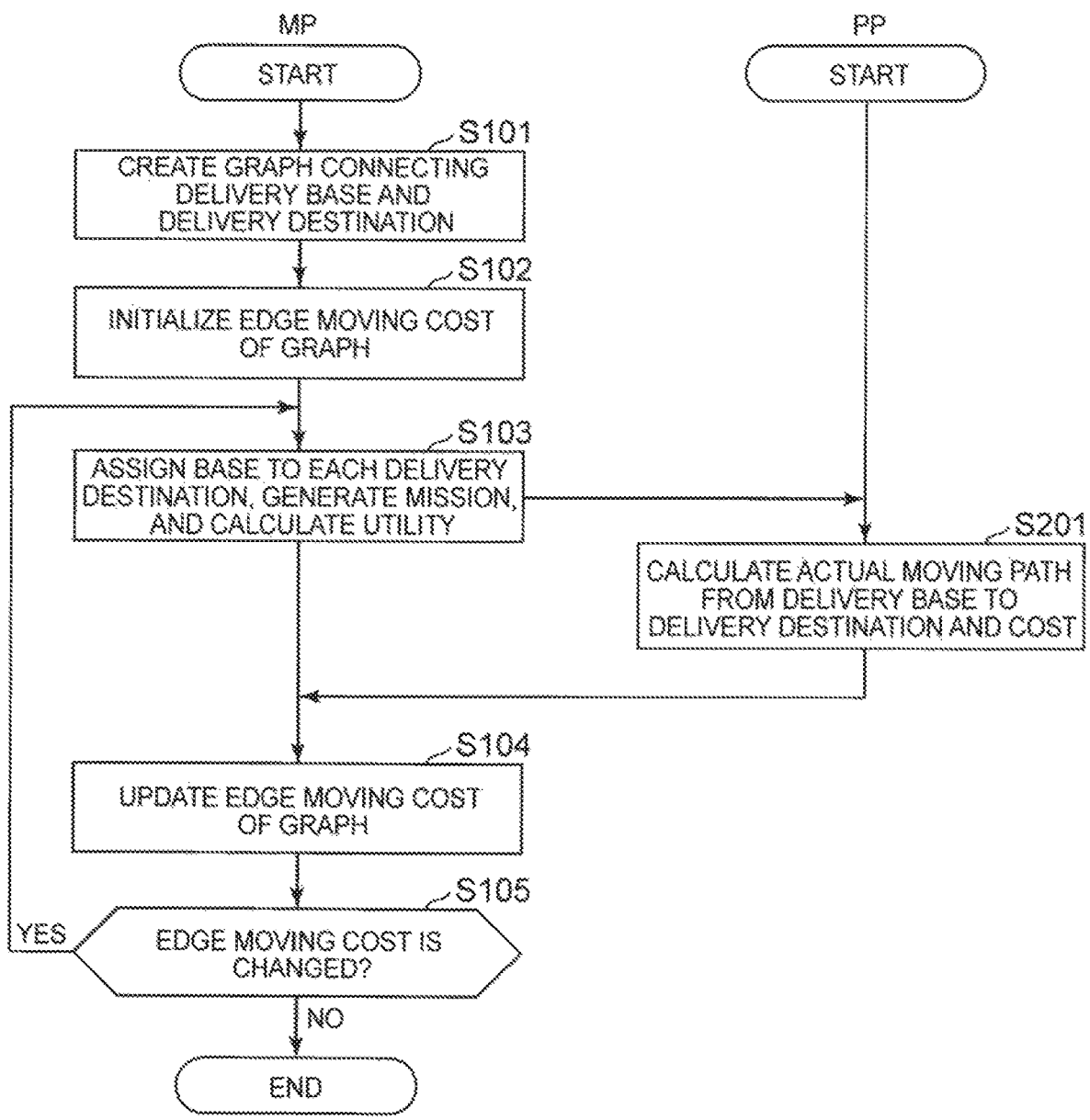
FIG. 8 It depicts a flowchart showing an example of a mission generation process in the second exemplary embodiment.

FIG. 8 is a flowchart showing an example of a mission generation process performed in steps S11 and S12.

FIG. 8 is an example of a mission generation process when a delivery task for a moving body is provided as a target task and when a package delivery scenario (a group of moving-body operation plans indicating a specific path) is generated as a mission. Examples of parameters for generating a package delivery scenario for the delivery task are shown below.

The own business operator has one or more delivery bases.

A plurality of delivery tasks each having the designation of a delivery destination and target arrival time is provided.

The MP assigns a delivery base (and/or a UAV) to each delivery task so as to maximize the utility.

The PP generates a path from the delivery base to the delivery destination for each UAV (the UAV assigned to each delivery base).

Each delivery task is provided with a reward for achievement.

As shown in FIG. 8, first, when the mission generation condition (target tasks, information on path selection areas, and the like) is provided, the MP 10A creates a graph (directed graph) connecting the delivery destination (goal point) and the delivery base of each target task (step S101). For example, the MP 10A may create a directed graph having a delivery base as a start point and a delivery destination as an end point.

Then, the MP 10A initializes the edge moving cost of the graph (step S102). Thereafter, the MP 10A assigns a base as a delivery source (start point) (and a moving body resource) to the delivery destination of each task, generates a mission, and calculates the utility of the mission (step S103). The mission generated here is equivalent to the above primary mission. At this time, the MP 10A may generate, for the provided target tasks, a mission whose current mission utility based on the edge moving cost of each graph has an optimal value.

Then, the MP 10A requests the PP 20A to calculate the actual moving path and cost (the optimal path and the actual cost of the path) for each graph included in the mission.

In response to the request, the PP 20A calculates, for the designated graph, a path for actual operation of the moving body from the provided path selection areas (the moving path as the optimal path or the like) and the actual cost of the path (step S201). At this time, the actual cost of the path may be set to a value based on the price of the area through which the path passes. Note that, the price may be set to 0 if the area has been acquired.

The MP 10A receives the calculation result from the PP 20A and updates each graph and the edge moving cost thereof (step S104). The mission obtained by this update is equivalent to the above secondary mission.

Then, the MP 10A determines whether the edge moving cost of any graph has been changed (step S105). If there is a change (Yes in step S105), the MP 10A returns to step S103 to revise the mission from the base assignment. If there is no change (No in step S106), the MP 10A outputs the current mission (the mission indicating that the moving path and moving cost corresponding to each graph are directly used as the path and moving cost of each moving body). The MP 10A may output, as the mission, a group of operation plans in which the moving path and the moving cost corresponding to each generated graph are directly used as the moving path and the moving cost of each moving body.

At this time, when a mission whose mission utility has the optimal value is generated in step S103 and when the path whose path cost has the minimum value (the optimal path) is derived in step S201, the MP 10A may output the current mission as the optimal mission.

Figure 9:
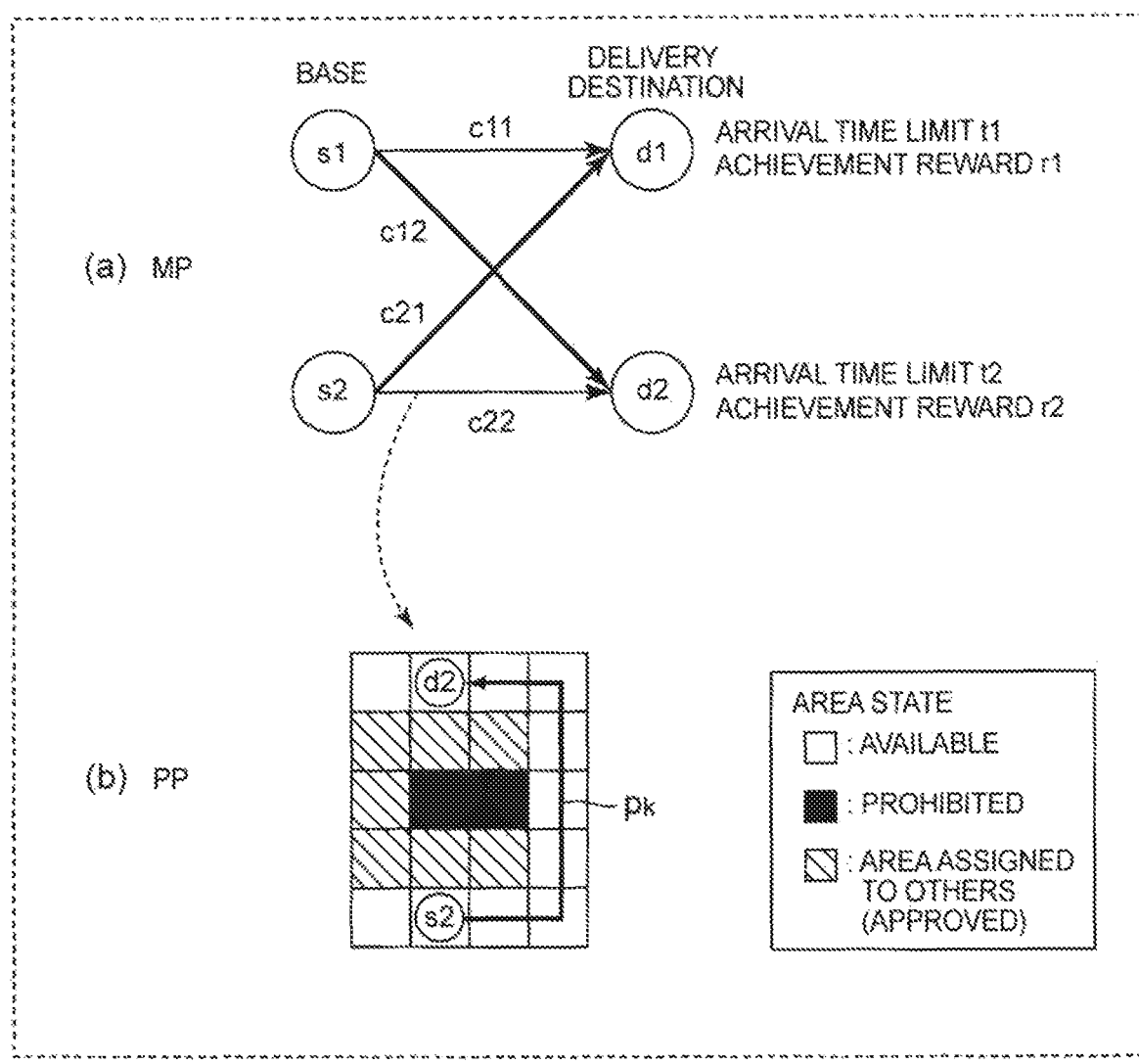
FIG. 9 It depicts an explanatory diagram showing a relation between a graph assigned by an MP 10A and a path.

Next, the operations of the MP 10A and the PP 20A will be described more specifically. FIG. 9 is an explanatory diagram showing the relation between the graph assigned by the MP 10A and the path derived by the PP 20A.

As shown in FIG. 9(a), the MP 10A may express a task by a directed graph connecting a base and a delivery destination of the task. In FIG. 9(a), s1 and s2 represent bases, and d1 and d2 represent delivery destinations of the task. In addition, c11, c12, c21, and c22 represent the moving costs (edge moving costs) of the directed graph. Here, in the notation "cxy", x represents a base identifier and y represents a delivery destination identifier. As shown in FIG. 9(b), when an effective graph is designated by the MP 10A, the PP 20A may derive a pass (path) based on the actual operation range, operation condition, and the like.

Figure 10:
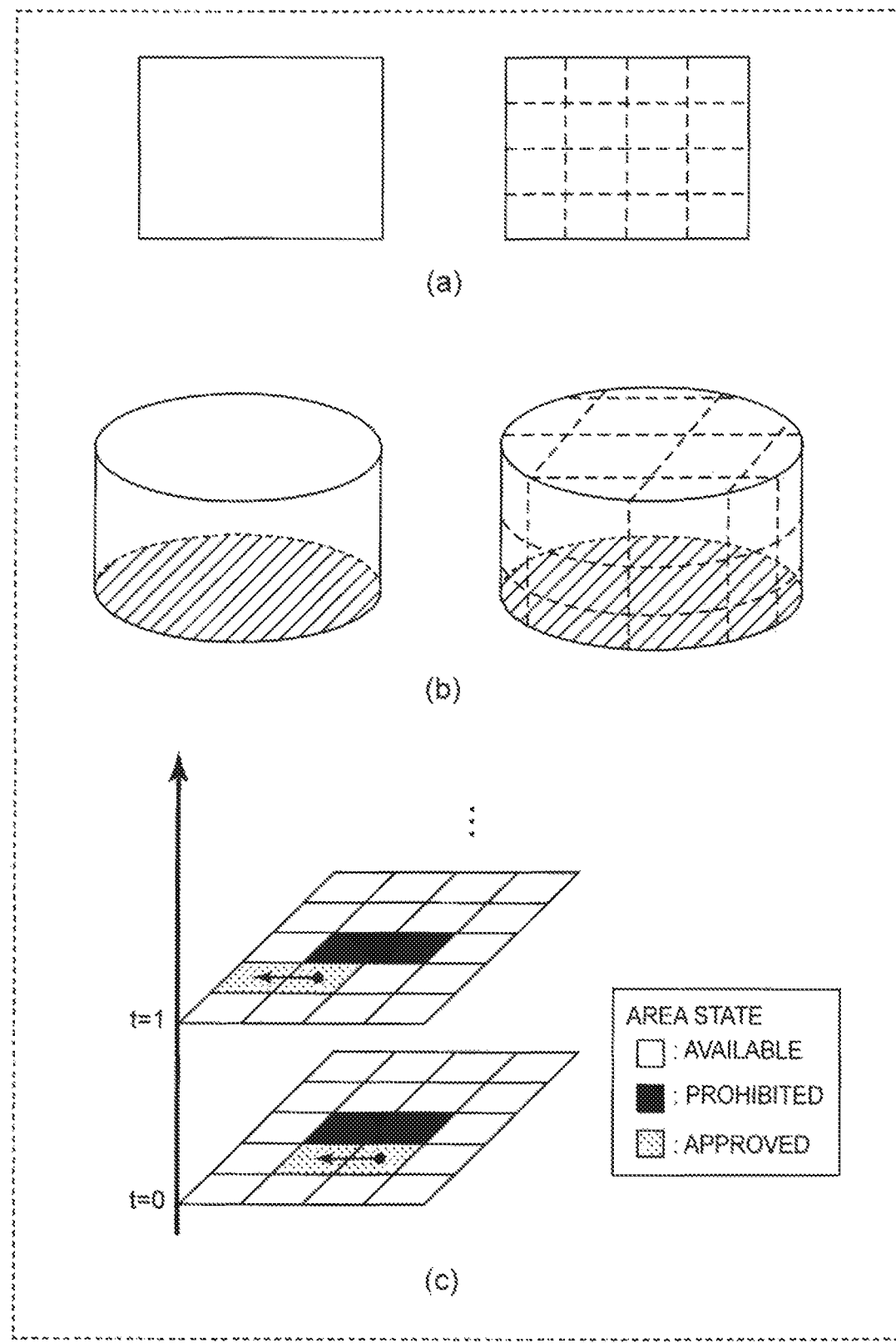
FIG. 10 It depicts a conceptual diagram of an area.

FIG. 10 is an explanatory diagram showing an example of an area definition. FIG. 10(a) is an explanatory diagram showing an example of an area defined in a two-dimensional space, and FIG. 10(b) is an explanatory diagram showing an example of an area defined in a three-dimensional space. Note that, an area may be managed by the area management system 200 as (space+1)-dimensional information (three-dimensional block information) divided by space coordinates (in this example, two-dimensional coordinates) and time (FIG. 10(c)). In the following, in order to simplify the explanation, an area extending two-dimensionally as a path of a moving body is exemplified. However, it is easily conceivable for those skilled in the art that the path is applicable to an area extending three-dimensionally (see FIG. 11).

Examples of the MP 10A that generates a mission for a delivery task related to the delivery performed by the UAV as the moving body 30 include the following functions and objective functions.

Functions of MP 10A:
To calculate the mission m* that maximizes the mission utility u(m).

Here, u(m) and m* may be similar to the above expressions (1) and (3). In this example, the mission m is expressed by a combination of moving body resource assignments for provided tasks.

Constraint Condition:
Flow conservation laws, edge capacity constraint, etc.

For example, the MP 10A may apply a flow conservation law as a constraint condition. That is, a constraint that, at the start point (base), the goal point (delivery destination), and the relay point therebetween, the input/output amount (in this example, the number of moving bodies entering and leaving each point) is the same may be provided. For example, the MP 10A may further add a constraint regarding the edge capacity as a constraint condition. Here, the edge capacity represents the number of moving bodies that can be assigned to one task from each base. For example, if only one moving body is used for delivery, the capacity is set to 1.

Initial Value of Moving Cost:
Euclidean distance (estimation)
The MP 10A may estimate the initial value of the moving cost (the edge moving cost of each graph) using the Euclidean distance.

Re-Planning of Mission:
If the moving cost is changed, the mission is re-planned online (immediately). At this time, an efficient solution to the minimum flow cost problem, such as the negative cycle removal, may be used.

In addition, examples of the PP 20A that generates a path for the mission assigned by the MP 10A include the following functions and objective functions.

Functions of PP 20A:
To constrain the mission m* to calculate an optimal path $p_k^*$ of the kth UAV.

Here, $p_k^*$ may be similar to the above expression (4). However, c(p) is $c(p_k)$.

Example of Constraint Condition (to Derive Path):
(1) Start and goal points
(2) Time limit for reaching the goal
(3) Using Only available area
(4) Within continuous flying time Re-Planning of Path:

If the moving cost is changed, the path is re-planned online (immediately). At this time, an online path planning algorithm, such as D* (D star), may be used.

Figure 11:
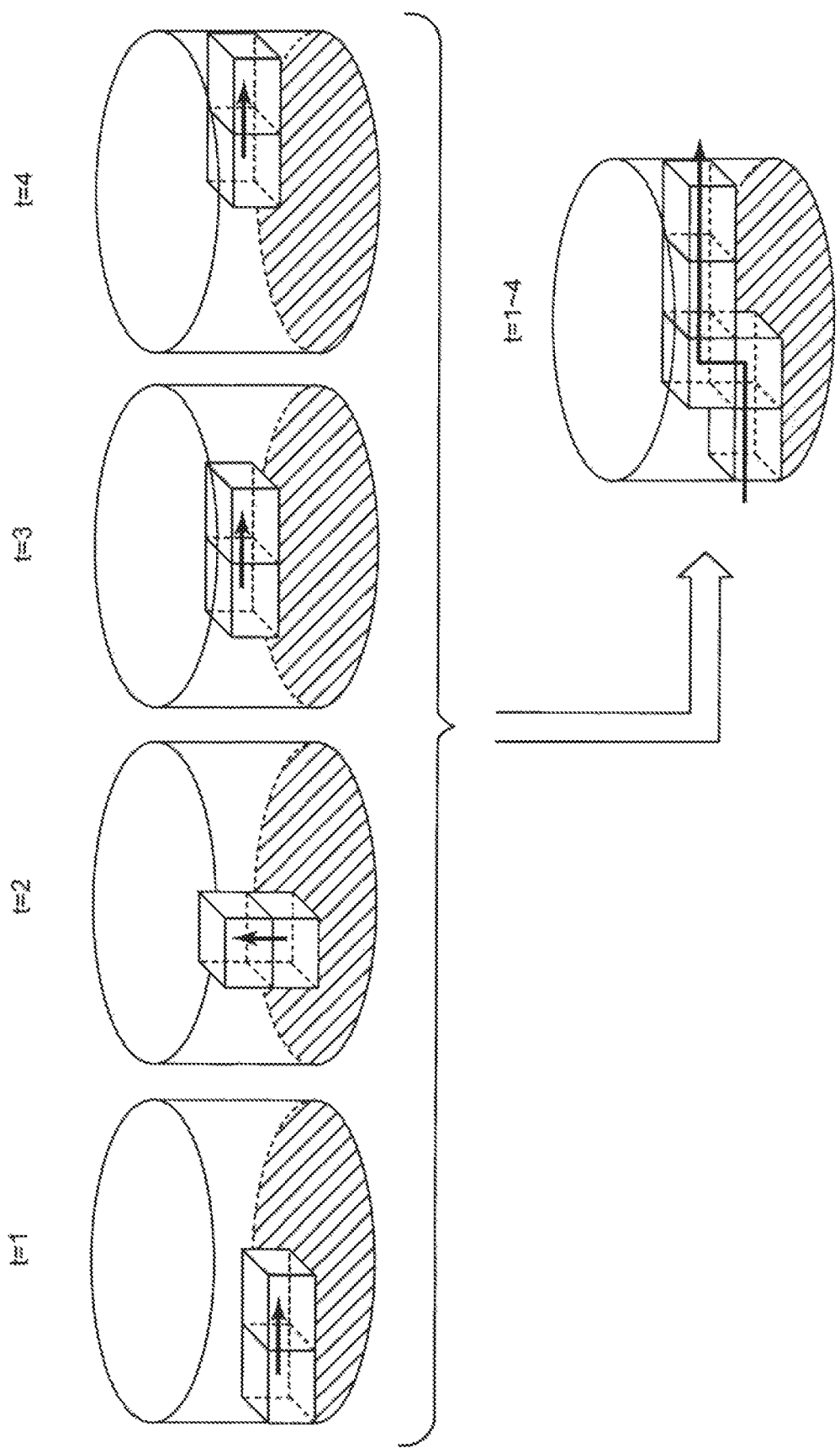
FIG. 11 It depicts a conceptual diagram of an area.

Consideration of Time Axis:

When the area state is managed with a (space+1)-dimensional coordinate block (for example, a four-dimensional block) divided by space coordinates (for example, three-dimensional coordinates) and time, a path is planned in consideration of the time axis (see FIG. 9(c), FIG. 11, and the like).

Next, the mission generation process (see FIG. 8) will be described with a specific example. The input and output of the MP 10A in this example are as follows.

Input of MP 10A:
(1) A set of delivery tasks (delivery destinations, delivery request times (arrival time limits), and rewards if any)
(2) A set of delivery bases (and moving body resources thereof)
(3) Area status of areas to be used for operation (whether each is prohibited to use or not or approved or not, and the price thereof to use, etc.)

Output of MP 10A:
Plan of a mission (a group of operation plans) and utility thereof FIG. 12(a) shows an example of input information in this example. As shown in FIG. 12(a), in this example, it is assumed that (delivery destination, arrival time limit, reward)={(d1, 20, 100), (d2, 20, 100)} is input for (1) delivery task, and delivery base={s1, s2} is input for (2) delivery base.

Calculation flow:

(Step S101):

The MP 10A creates a graph connecting a delivery point and a delivery destination. FIG. 12(b) is an example of a graph created in this example.

(Step S102):

The MP 10A initializes the edge moving cost of the graph as a linear distance movement time (linear distance/moving speed) between two points (see FIG. 12(b)). In this example, the edge moving costs c11, c12, c21, and c22 of the graphs (a graph g11 connecting s1-d1, a graph g12 connecting s1-d2, a graph g21 connecting s2-d1, and a graph g22 connecting s2-d2) are calculated as 4, 15, 15, and 3, respectively.

(Step S103):

The MPA 10A assigns a base (and a moving body resource) as a delivery source (start point) to each delivery task. At this time, the MPA 10A may assign a base with the lowest edge moving cost (and a moving body resource thereof) to the delivery destination of each delivery task. As a result of assigning the bases to all the delivery tasks, the above primary mission is generated.

In the example shown in FIG. 12(b), the base 1 with the edge moving cost c11=4 is assigned to the delivery destination 1, and the base 2 with the edge moving cost c22=3 is assigned to the delivery destination 2. Note that, when assigning the bases to all the delivery tasks, the MPA 10A may calculate the utility of the current mission (the current graph set) based on the edge moving costs of all the delivery tasks and the rewards of all the delivery tasks, which are defined according to the assigned bases (hereinafter, referred to as the delivery bases). For example, in the case of the example shown in FIG. 12(b), the utility of the mission is calculated as follows.

(Primary) Mission utility:
Mission reward=sum of task rewards=100+100=200
Mission cost=sum of moving costs of tasks (initial values)=4+3=7
Mission utility=mission reward−mission cost=200−7=193

(Step S201):

The PP 20A calculates, for all the graphs (that is, moving body resources represented by pairs of a delivery destination and a delivery base) included in the mission generated in step S103, the optimal path from the delivery base to the delivery destination and the moving cost thereof in the provided path selection areas and notifies the MP 10A of the result. At this time, the PP 20A in this example plans the path in consideration of the time axis.

Figure 13:
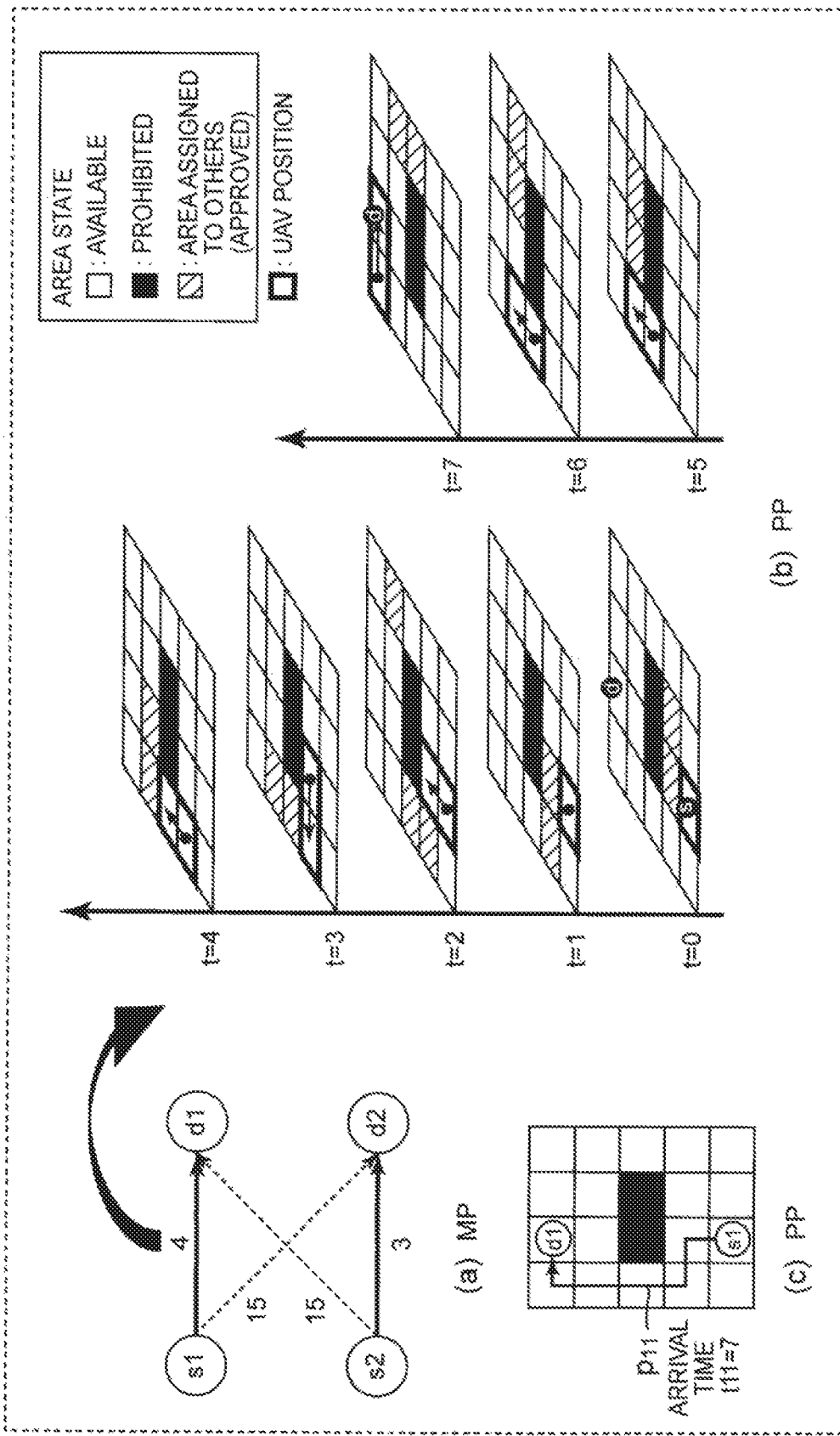
FIG. 13 It depicts an explanatory diagram showing an example of an optimal path and moving cost calculated by a PP 20A.

FIG. 13 is an explanatory diagram showing an example of the optimal path and moving cost calculated by the PP 20A. The example shown in FIG. 13 is a calculation example for the graph g11 connecting s1-d1 shown in FIG. 12. FIG. 13(a) shows a graph generated by the MP 10A, and FIGS. 13 (b) and 13 (c) show the optimal path and the moving cost calculated by the PP 20A. Note that, the space forming the area is expressed in a two-dimensional plane for simplification in FIGS. 13(b) and 13(c), but the space is a three-dimensional space in the case of an air space. In this case, the PP 20A is only required to plan the path in consideration of the time axis in the four-dimensional block divided by the three-dimensional coordinates (spatial coordinates) and time. In FIG. 13 (b), the area assigned to another person changes with time, which means that the person also plans a path and performs operation in consideration of the time axis.

In the example shown in FIG. 13(a), the moving cost calculated by MP 10A (the linear distance movement time between s1-d1) is 4, but the moving cost calculated by the PP 20A (actual arrival time) is 7 as shown in FIG. 13(c).

(Steps S104 to S105):

The MP 10A updates the moving cost on the graph based on the calculation result from the PP 20A. FIG. 14(a) shows a graph before the update, and FIG. 14 (b) shows a graph after the update. In this example, it is assumed that the PP 20A calculates the moving cost between s1-d1 as c11=7 and the moving cost between s2-d2 as c22=25. In that case, the MP 10A determines that the moving cost has been updated, returns to step S103, and revises the mission.

(Second step S103):

For example, when the utility of the mission after the update is lower than the utility of the mission before the update, the MP 10A may revise the mission from the assignment of the base. In the case of this example, the utility of the mission before the update is mission reward (100+100)−mission cost (4+3)=193, but the utility of mission after the update is mission reward (100+0)−mission cost (7+N/A)=93. Here, regarding the graph (task) that cannot be achieved because the arrival time limit has been exceeded (for example, see between s2-d2 in the drawing), the utility of the mission is calculated without reflecting the reward and cost in the reward and cost of the mission.

Based on this result, the MP 10A may revise the mission (reassign the base). In this example, the delivery base for the delivery destination d2 is changed from s1 to s2. This process is equivalent to deleting the graph g22 from the graph set representing the mission and adding the graph g12. Then, the MP 10A requests the PP 20A to calculate the actual moving path and the cost for the graph g12 newly added to the mission.

(Second step S201)

Similarly to the first time, the PP 20A calculates, for the designated graph, the optimal path from the delivery base to the delivery destination and the moving cost thereof in the provided path selection areas and notifies the MP 10A of the result. In this example, it is assumed that the PP 20A calculates the moving cost (actual arrival time) of the graph as 18.

Subsequently, the MP 10A updates the moving cost of the graph according to the result and re-calculates the utility of the mission. In the case of this example, the utility of the mission after the update is mission reward (100+100)−mission cost (7+18)=175 (see FIG. 14(c)).

In this example, the MP 10A revises the mission again since the PP 20A derives the optimal path and the moving cost is updated accordingly. At this time, when, as a result of revising the assignment of the delivery base, there is no other base that can be assigned or when the utility of the mission after the base is changed is less than the utility of the current mission, the MP 10A does not change the mission and simply terminates the process. In the case of this example, since there is no other base that can be assigned, the MP 10A determines that the current mission is the optimal mission and terminates the process.

Next, a method of utilizing the area evaluation in the present exemplary embodiment will be described with a specific example.

a. (at the Time of Applying for Operation Plan)

1. (Bidding Auction Style)

In the following, an example of area evaluation when areas are assigned in a bidding auction style at the time of applying for an operation plan will be described. In the example described below, it is assumed that the path price changes in an auction.

When area are assigned based on an auction, an area administrator may receive a bid for an operation plan for a certain period of time before the start of the operation. At this time, the bid price of the operation plan may be determined by the price of each area to be used in the operation plan, for example. As an example, the sum total or maximum value of the prices of the areas to be used in the operation plan is included. Then, the price of each area is increased in an auction according to the number of applications for the area, that is, the number of operation plans including the area. The following are examples of an area price and a path price (prices required for bids for an operation plan) in an auction.

Area price=price when another person has previously applied for use of the path including the area+1     (a11)

Path price=maximum value of each area included in the path     (a12)

In this case, each business operator may calculate the mission utility by estimating the moving cost of the moving body for the path indicated by the own operation plan, as follows.

Moving cost=a×f(arrival time)+b×g(path price)     (a13)

In the expression (a13), a and b represent coefficients, and f( ) and g( ) represent arbitrary functions. As described above, as the mission utility u(m), Σ(reward)−Σ(moving cost) for all the tasks related to the mission is only required to be calculated.

Figure 15:
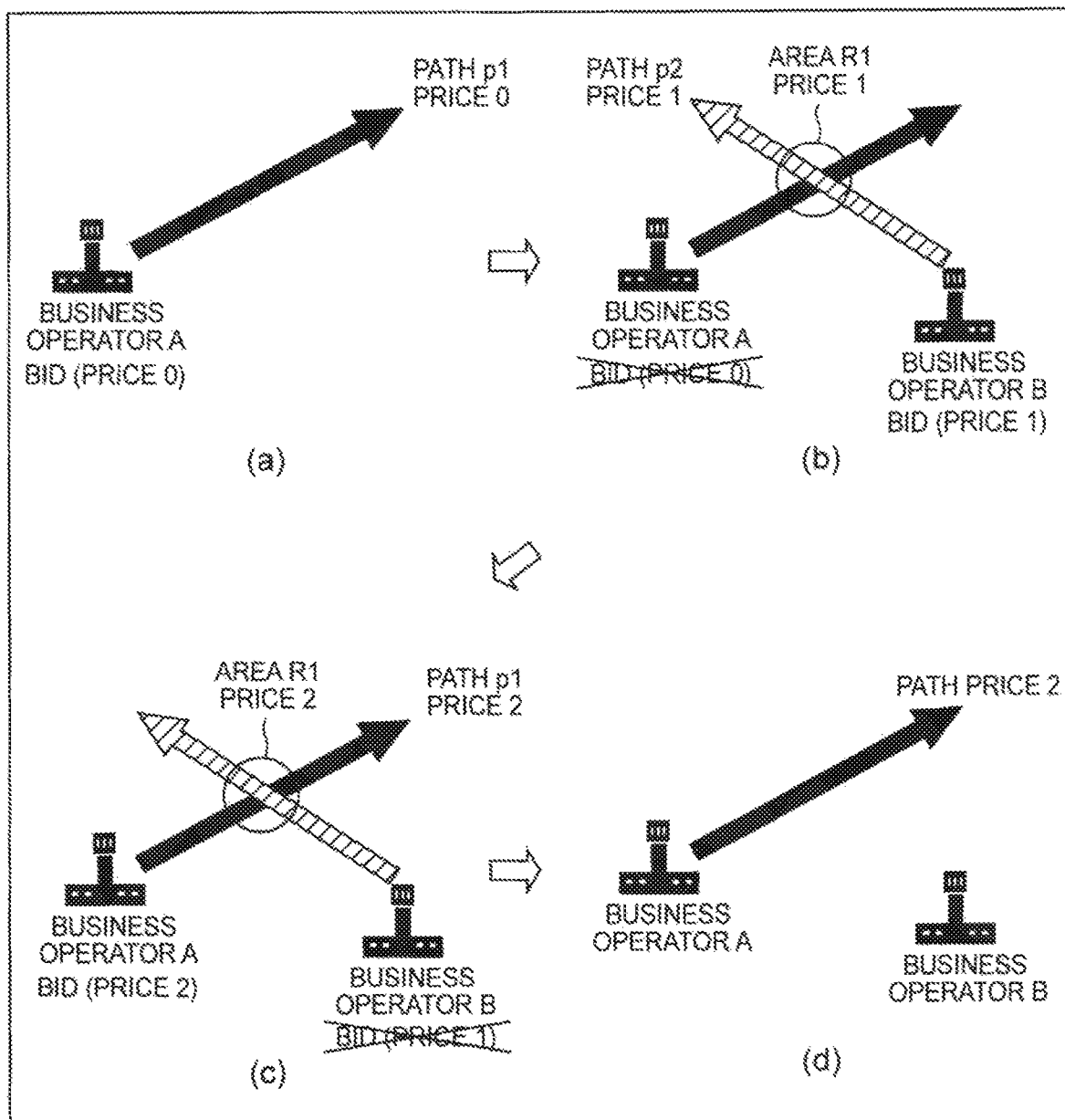
FIG. 15 It depicts an explanatory diagram showing an example of pricing of a path in an auction.
Figure 16:
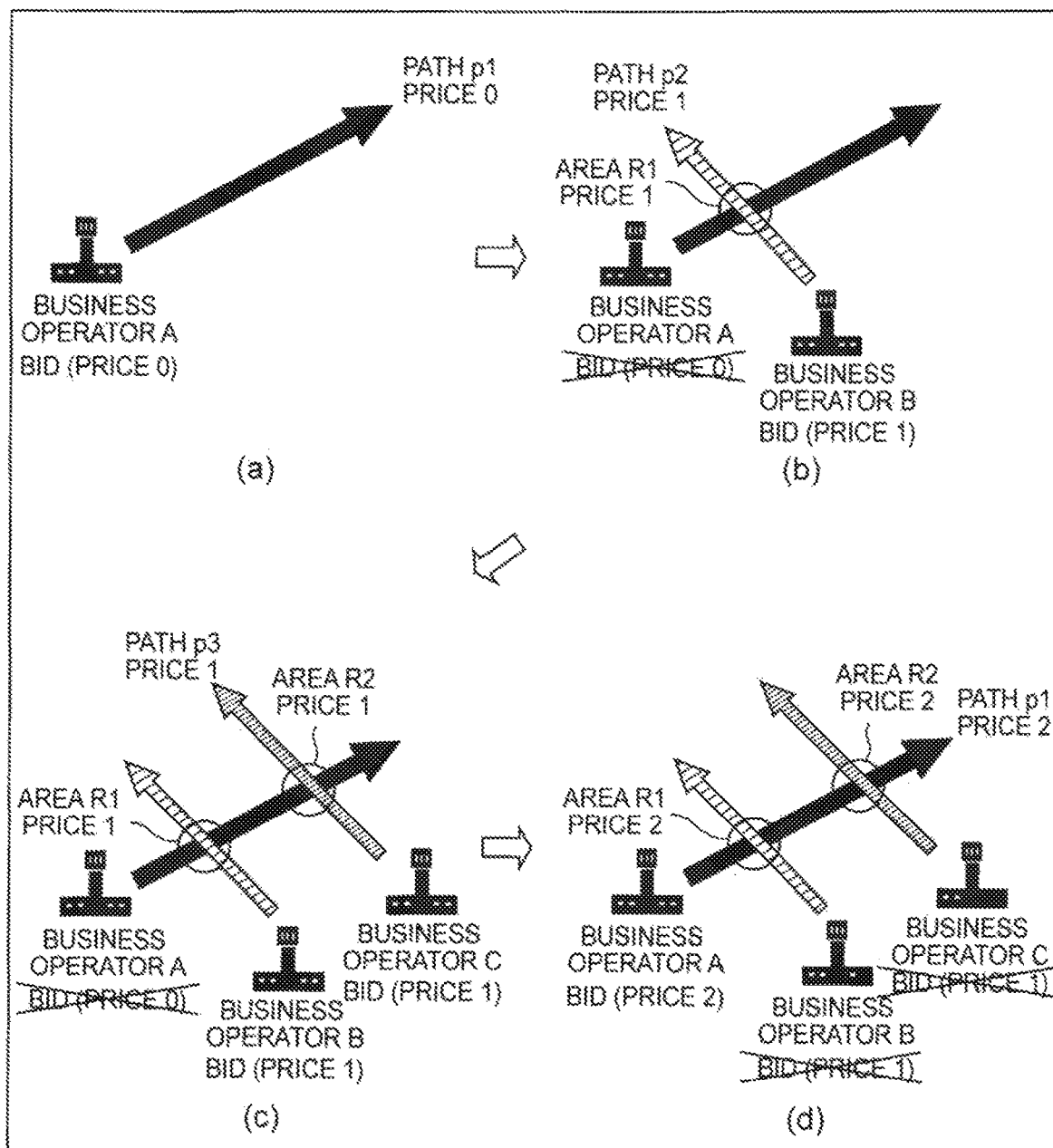
FIG. 16 It depicts an explanatory diagram showing an example of pricing of a path in an auction.

FIGS. 15 and 16 are explanatory diagrams showing an example of pricing a path in an auction. In the example shown in FIG. 14, a business operator A firstly bids for a path p1 (FIG. 15(a)). At this time, the business operator A can bid the initial price (0 in this example) because the path p1 does not interfere with the operation plan of any other business operators (overlap any other areas).

Then, a business operator B bids for a path p2 (FIG. 15(b)). At this time, since the path p2 interferes with the path p1 of the business operator A in the area R1, the business operator B bids, for the path p2 including the area R1, the price=1 that is higher by one than the current price of the interference area R1=0. This is because, as a result of the interference with the path p1, the bid price of the area R1 is increased to 1, and the bid price of the path p2 including it also becomes 1.

As a result of the business operator B bidding the price=1 for the path p2, the price of the area R1 becomes 1, and the price of the path p1 including the area R1 also becomes 1 accordingly. Thus, the path p1 of the business operator A who has bid a lower price is denied.

In order for the business operator A to re-bid for the same path p1, the business operator A needs to bid a higher price than the current price of the path p1=1 (this is equivalent to the highest price bid by the other business operator for the area on the path p1). That is, the business operator A needs to bid the price=2 that is higher than the bid price of the path p2 of the business operator B who has bid the price=1 for the area R1. In this example, the business operator A re-bids the price=2 for the path p1 (FIG. 15(c)).

Then, if the business operator B refuses a further bid, the path p1 is assigned to the business operator A. The business operator A pays the bid price=2 for the path p1 (FIG. 15(d)).

The example shown in FIG. 16 is the same as the example shown in FIG. 15 until the business operator B bids the price=1 for the path p2 (FIG. 16(b)). In this example, as a result of the business operator B bidding the price=1 for the path p2, the price of the area R1 becomes 1, and the value of the path p1 including the area R1 also becomes 1 accordingly. Thus, the path p1 of the business operator A who has bid a lower price is denied.

In addition, a business operator C bids for the path p3 in this example (FIG. 16(c)). At this time, the business operator C bids, for the path p3, the price=1 that is higher by one than the current price of the area R2=0, which is an area interfering with another path. This is because, as a result of the interference of the path p2 with the path p2, the bid price of the area R2, which is the interference area, is increased to 1, and the bid price of the path p3 including it also becomes 1.

As a result of the business operator C bidding the price=1 for the path p3, the price of the area R2 becomes 1, and the value of the path p1 including the area R2 also becomes 1 accordingly. Thus, the path p1 of the business operator A is denied.

In order for the business operator A to re-bid for the same path p1, the business operator A needs to bid a higher price than the current price of the path p1=1 (this is equivalent to the highest price bid by other business operator for the area on the path p1). In the case of this example, the business operator A needs to bid the price=2 that is higher than the bid price for the path p2 of the business operator B who has bid the price=1 for the area R1 and the bid price for the path p3 of the business operator C who has bid the price=1 for the area R2 (FIG. 16(d)).

Note that, if the business operator A refuses a further bid, the path p2 is assigned to the business operator B, and the path p3 is assigned to the business operator C, although this is not shown. Each business operator pays its own bid price=1 for the assigned path.

On the other hand, if the business operator A re-bids the price=2 for the path p1, the prices of the area R1 and the area R2 become 2, and the values of the path p1 and the path p2 including the area become 2. Thus, the path p2 of the business operator B and the path p3 of the business operator C are denied.

Figure 17:
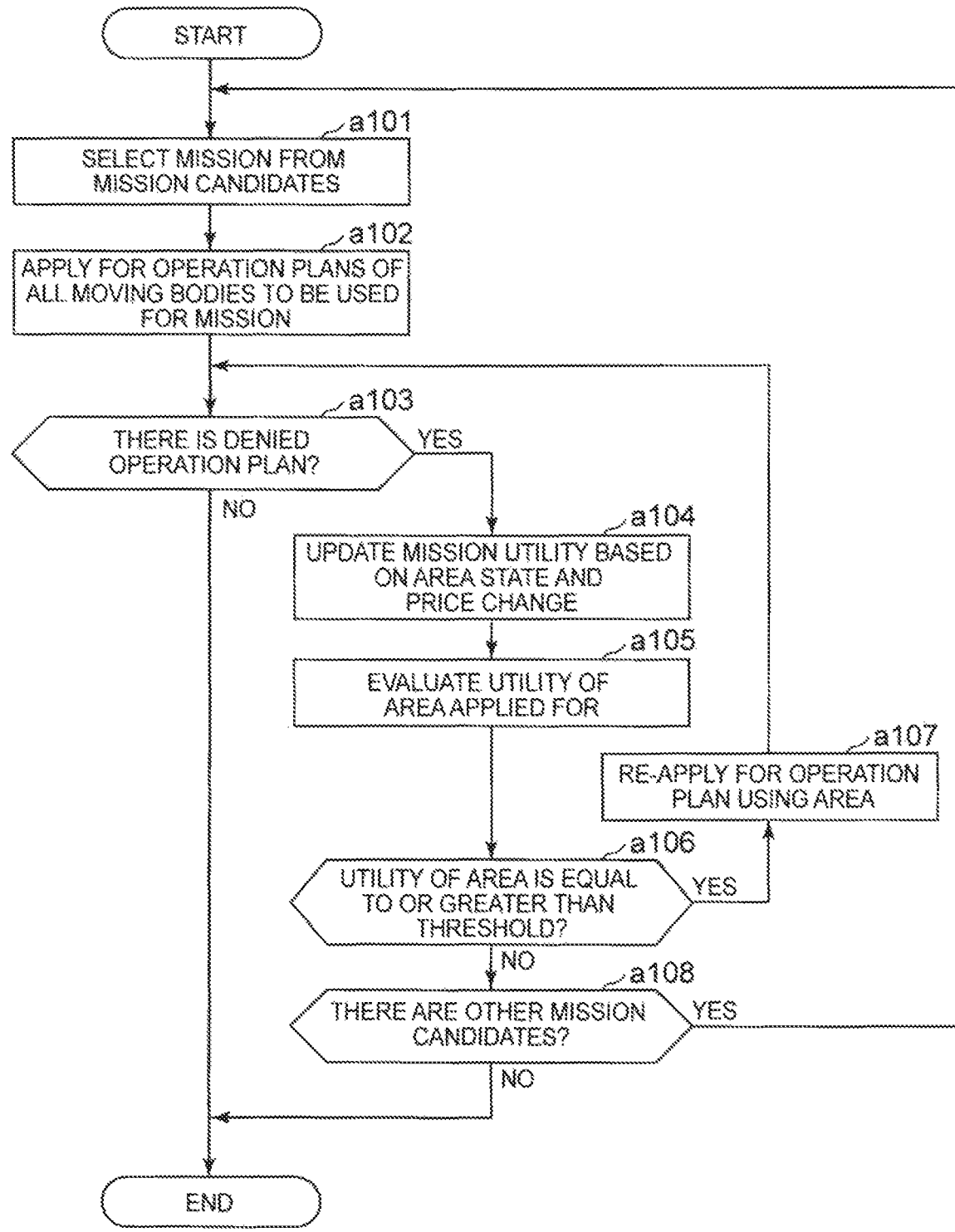
FIG. 17 It depicts a flowchart showing an operation example of the mission management system 100A when an area is reserved in an auction system.

Next, the operation of the entire mission management system 100A when an area is reserved in an auction system as described above will be described. FIG. 17 is a flowchart showing an operation example of the mission management system 100A when an area is reserved in an auction system.

In the example shown in FIG. 17, first, the MP 10A selects one mission from a plurality of missions generated by itself for provided target tasks (hereinafter, referred to as mission candidates) (step a101).

Then, the operation-plan application unit 50A applies to the area management system 200 for the operation plans of all the moving bodies to be used for the selected mission (step a102). The application for the operation plan here is equivalent to "the bid for the path" in the auction described above.

The area management system 200 assigns areas to be used for the operation plan applied for in accordance with the auction system as described above and returns the approval/denial determination result of the operation plan based on the area assignment result. The approval of the operation plan here is equivalent to "the assignment of the area for the path bid for" in the auction described above, and the denial of the operation plan is equivalent to "the denial of the path bid for".

When receiving the approval/denial determination result of the operation plan, the operation-plan application unit 50A determines whether there is a denied operation plan (step a103). If there is no denied operation plan (No in step a103), the current mission is settled as the mission for the provided target tasks, and the process is terminated.

On the other hand, if there is a denied operation plan (Yes in step a103), the MP 10A updates the utility of the current mission based on the state of the area included in the denied operation plan (path) (as to whether the area is assigned or not, or the like) and the price change (step a104).

Then, the area evaluation unit 40A evaluates the utility of the area applied for, particularly, the area to be used for the denied operation plan (step a105).

If the utility of the area is equal to or greater than a threshold (Yes in step a106), the operation-plan application unit 50A re-applies for the operation plan using the area (step a107). The operation-plan application unit 50A changes the price to re-apply for the denied operation plan, for example. Note that, after step a107, the process returns to step a103 to wait for the application result.

On the other hand, if the utility of the area is less than the threshold (No in step a106), the MP 10A determines whether there are other mission candidates (step a108). If there are other mission candidates (Yes in step a108), the MP 10A returns to step a101 and repeats the above process from the selection of a mission.

On the other hand, if there is no other mission candidate (No in step a108), the MP 10A determines that the task related to the path cannot be executed (there is no solution) to terminate the process. Note that, depending on the results of other auctions, the area interfering with another operation plan that causes the denial this time can be released (the other operation plan cannot be not bid for because of competition in other interference areas, or the like). In that case, the application may be performed again after a while.

Figure 18:
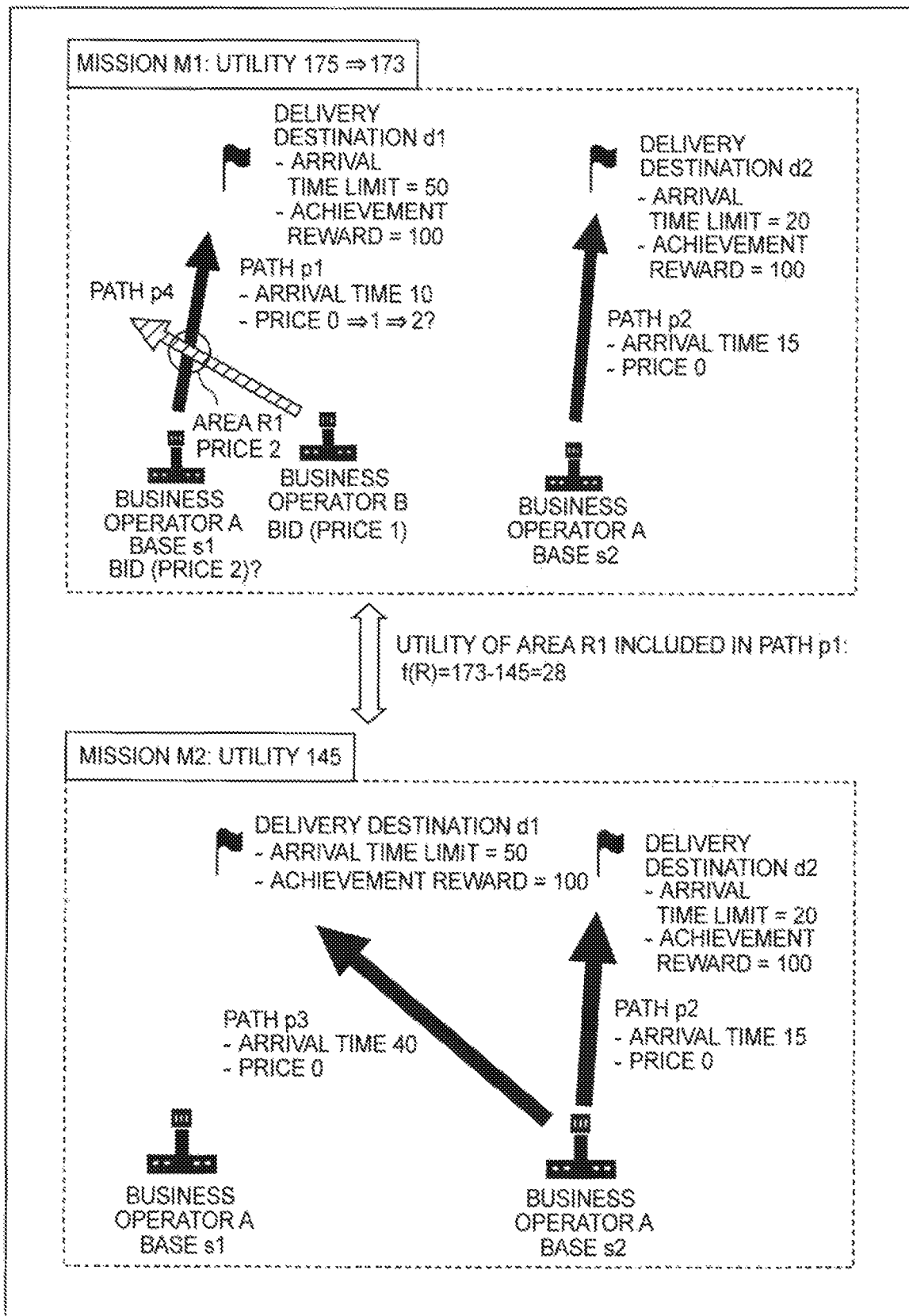
FIG. 18 It depicts an explanatory diagram showing an evaluation example of the utility of an area during an auction.
Figure 19:
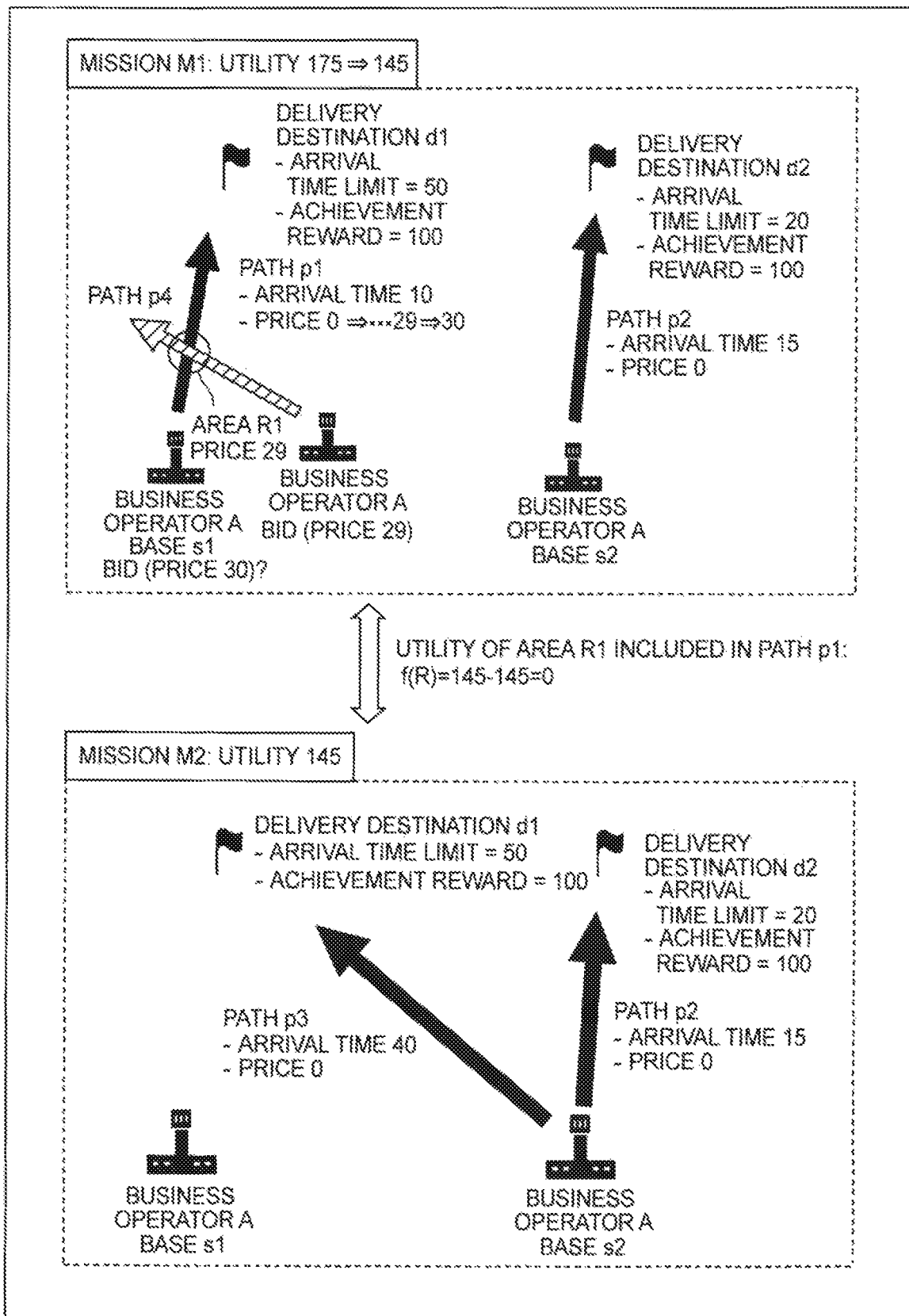
FIG. 19 It depicts an explanatory diagram showing an evaluation example of the utility of an area during an auction.
Figure 20:
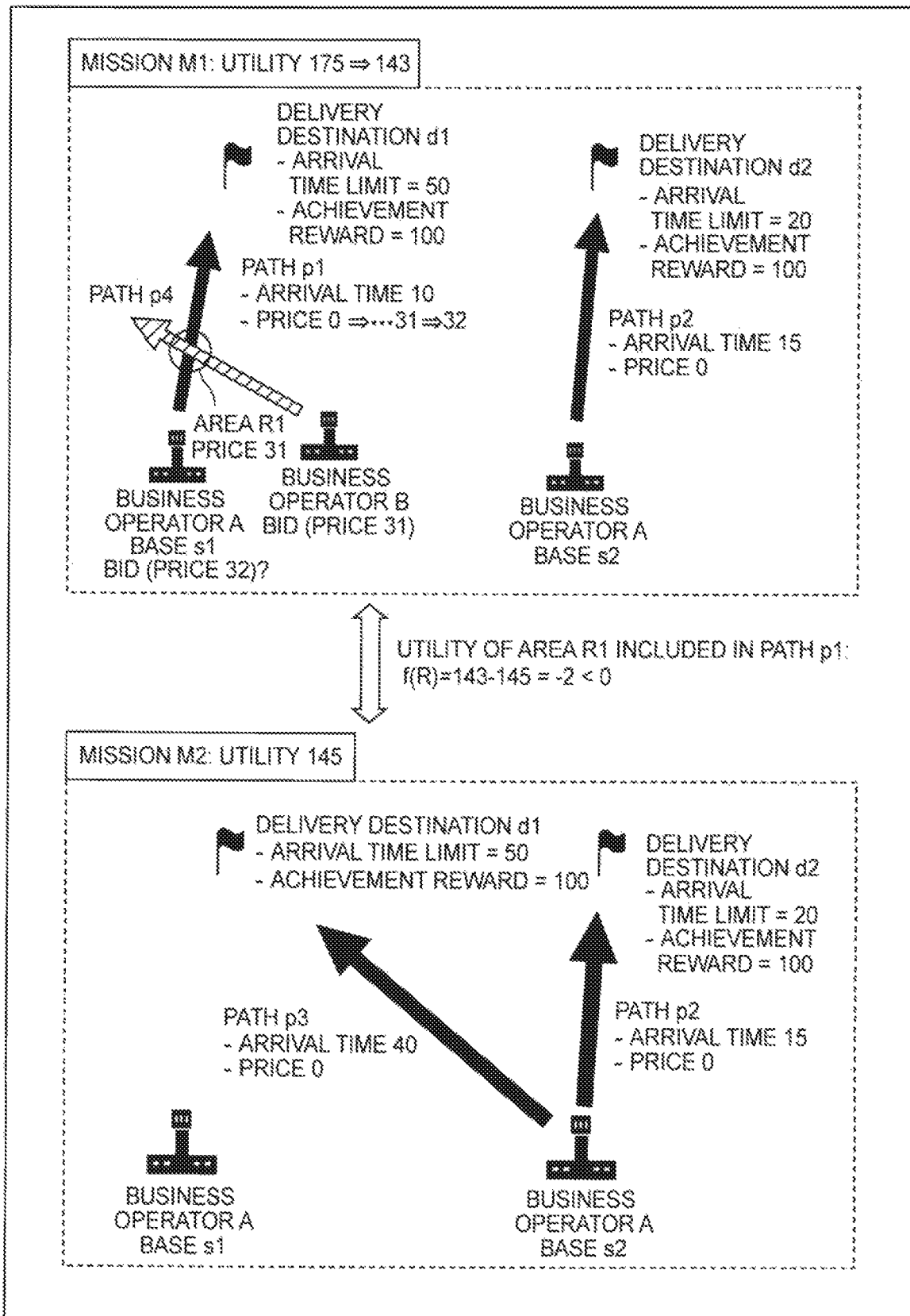
FIG. 20 It depicts an explanatory diagram showing an evaluation example of the utility of an area during an auction.

FIGS. 18 to 20 are explanatory diagrams showing specific examples of evaluation of the utility of an area during an auction. FIGS. 18 to 20 each show a specific example of the area evaluation performed each time the operation plan applied for is denied when there are two missions (M1 and M2) as mission candidates.

The example shown in FIG. 18 is a case in which the business operator B applies for a path p4 with the price=1 because the business operator A applies for a first operation plan corresponding to the path p1 included in the mission M1 and a second operation plan corresponding to the path p2 with the price=0, and the first operation plan corresponding to the path p1 is denied. In this example, it is assumed that the utility of the mission M1 before the application is u(M1)=mission reward (100+100)−mission cost ((10+0)+(15+0))=200−25=175. In addition, it is assumed that the utility of the mission M2, which is another mission candidate is u(M2)=mission reward (100+100)−mission cost ((40+0)+(15+0))=200−55=145. The mission cost (40+0) represents the moving cost (arrival time (40)+path price (0)) of the path p1 corresponding to the first task (delivery destination d1). In addition, (15+0) represents the moving cost (arrival time (15)+path price (0)) of the path p2 corresponding to the second task (delivery destination d2). The same applies to the notation of mission cost.

In the case of this example, in step a104, the MP 10A of the business operator A is only required to update, for the denied first path, the utility of the mission M1 based on the current price of the area R1, which is the interference area notified as the reason for the denial (in the case of this example, the price=1), the path price of the path p1 (bid price)=2 based on it, or the like. For example, the MP 10A is only required to reflect the path price (bid price of the path)=2 in the moving cost (arrival time=10) of the path p1 in the above mission cost (10+15) to re-calculate the utility of the mission M1. The utility is equivalent to the utility of the mission M1 when the path is re-applied for. In this example, the utility of the mission M1 after the re-calculation is u(M1)=mission reward (100+100)−mission cost ((10+2)+(15+0))=200−27=173.

Then, in step a105, the area evaluation unit 40A evaluates, based on the utility u(M1) of the mission M1 including the area R1 after the update and the utility u(M2) of the mission M2 not including the area R1, the utility f(R1) of the area R1 that is the reason for the denial of the denied path p1 as follows.

$$f(R1)=u(M1)-u(M2)=173-145=28$$

In the next step a106, it is determined whether the calculated utility of the area R1 is equal to or greater than a predetermined threshold. In this example, the threshold is set to 0. Since f(R1) is equal to or greater than 0, the process proceeds to step a107.

In step a107, the operation-plan application unit 50A re-applies for the first operation plan corresponding to the path p1 with the price=2.

Thereafter, when the business operator B re-bids the price=3 for the path p4, the business operator A receives the notification of the denial again. As a result of repeated re-bids of the two business operators in this manner, for the first path, it is assumed that the business operator A is notified of denial and the current price (in this example, the price=29) of the area R1, which is the interference area, as the reason of the denial, and the path price (bid price) of the path p1 based on it (see FIG. 19).

FIG. 19 is a calculation example of the area utility when the path price of the path p1 becomes 30 as a result of the re-bid (the price=29) of the business operator B for the path p4. In the example shown in FIG. 19, the utility of the mission M1 after the re-calculation is u(M1)=mission reward (100+100)−mission cost ((10+30)+(15+0))=200−55=145, and the utility of the area R1 is calculated as f(R1)=u(M1)−u(M2)=145−145=0. Since f(R1) is equal to or greater than 0, the process proceeds to step a107, and the first operation plan corresponding to the path p1 is re-applied for with the price=30.

FIG. 20 is a calculation example of the area utility when the path price of the path p1 becomes 32 as a result of the re-bid (the price=31) of the business operator B for the path p4. In the example shown in FIG. 20, the utility of the mission M1 after the re-calculation is u(M1)=mission reward (100+100)−mission cost ((10+32)+(15+0))=200−57=143, and the utility of the area R1 is calculated as f(R1)=u(M1)−u(M2)=143−145=−2. Since f(R1) is less than 0, the process proceeds to step a108 without a further bid, and it is determined whether there are other mission candidates.

In step a108, since the mission M2 exists as other mission candidates, the process returns to step a101 to reselect a mission to be applied for. In this example, the mission M2 is selected, and, in the subsequent step a102, the operation-plan application unit 50A refuses a re-bid for the path p1 and bids for the path p3 included in the mission M2 instead. Note that, the approval state of the path p2 is only required to be simply maintained.

Note that, the example shown in FIG. 17 is an example when the MP 10A generates a plurality of mission candidates and selects an arbitrary mission among them as an application candidate of an operation plan. However, if the MP 10A selects in advance and outputs an optimal mission from the mission candidates, the operation as shown in FIG. 21 may be performed, for example.

Figure 21:
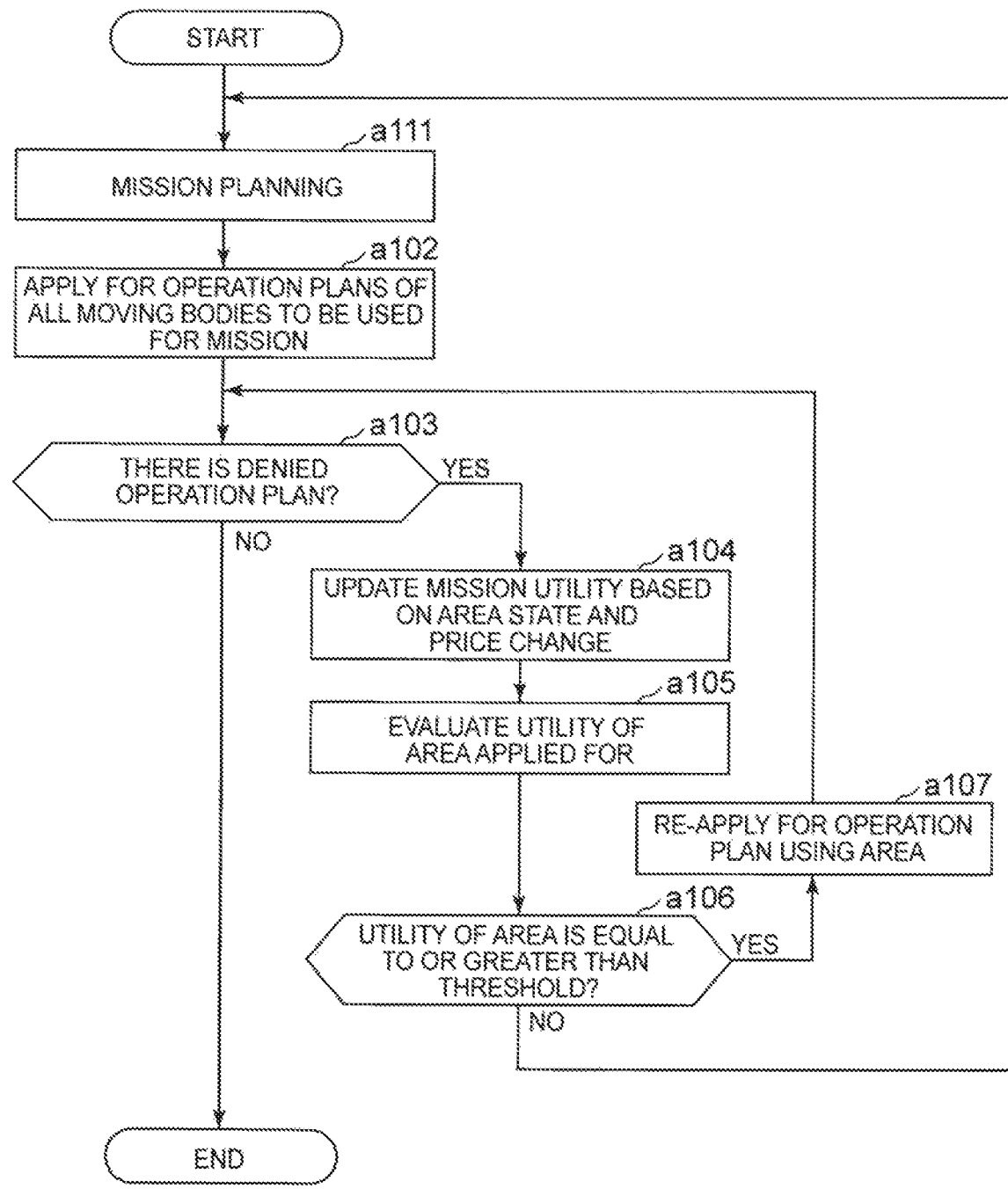
FIG. 21 It depicts a flowchart showing another operation example of the mission management system 100A when an area is reserved in an auction system.

FIG. 21 is a flowchart showing another operation example of the mission management system 100A when an area is reserved in an auction system. FIG. 21 is an operation example when the MP 10A generates in advance and outputs an optimal mission. The example shown in FIG. 21 is different in that the MP 10A performs a mission planning process for generating an optimal mission (step a111) instead of step a101 in FIG. 17 and that the operation of step a108 is omitted.

That is, in the example shown in FIG. 21, the MP 10A firstly performs a mission planning process for generating an optimal mission (step a111). At this time, the MP 10A may output, for example, an optimal mission in consideration of the state of the area and the path price from a plurality of mission candidates in the mission planning process.

As a method for generating the optimal mission, for example, a mission that maximizes the mission utility (a combination of task assignments) may be calculated as shown in Expression (3). At this time, the path to be used for each task may be arbitrary, but the moving cost of each path is calculated based on the path price as well as the arrival time. In calculating the mission (a combination of task assignments), an efficient solution to the minimum flow cost problem, such as the negative cycle removal, may be used.

Note that, subsequent steps from steps a102 to a106 are similar to the example shown in FIG. 17. In this example, if there is a denied operation plan in the selected mission (optimal mission) (Yes in step a103), and when the utility of the area applied for is less than the threshold (No in step a106), the process returns to step a111 without determining whether there are other mission candidates.

In second and subsequent step a111, the optimal mission (for example, the optimal path and the base assignment based on it) is revised after reflecting the current state of the area (after denial) and the path price. At this time, if there is no change in the mission content, it may be determined that the task related to the denied path cannot be executed (there is no solution) to terminate the process.

Figure 22:
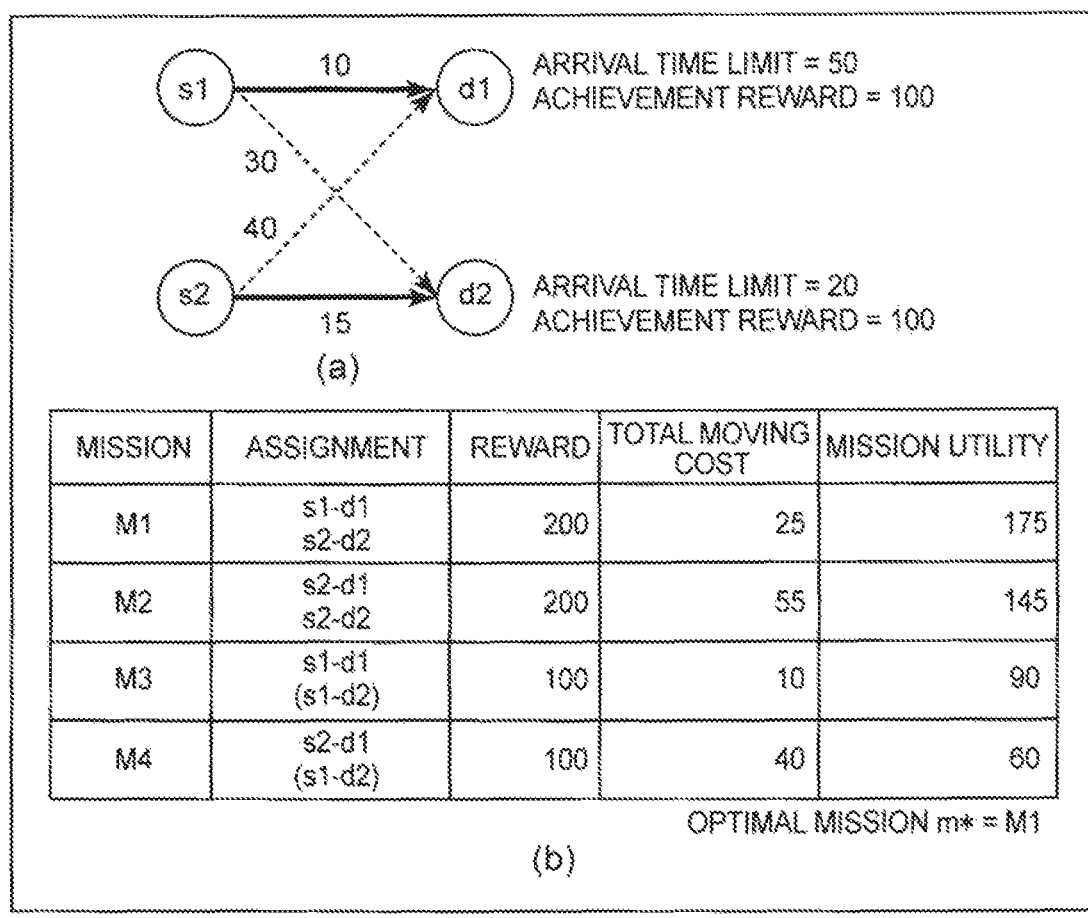
FIG. 22 It depicts an explanatory diagram showing a specific evaluation example of the utility of an area when an optimal mission is generated.
Figure 23:
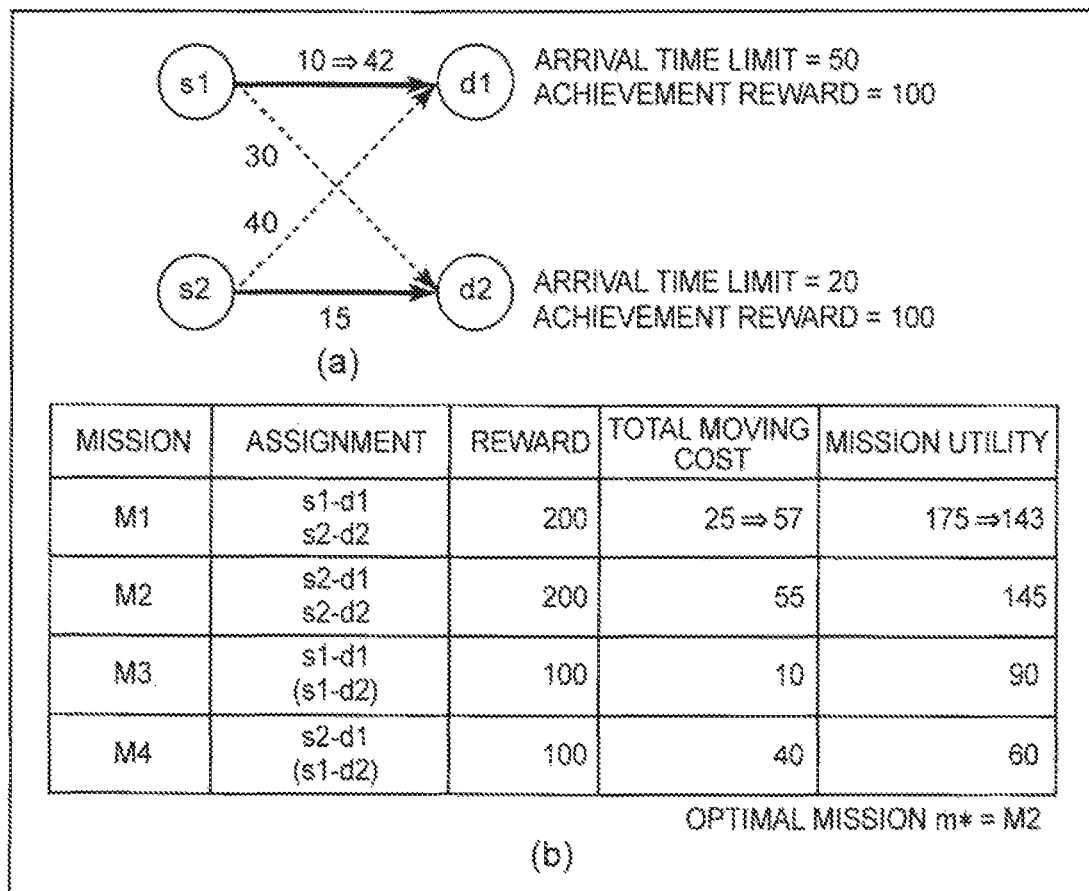
FIG. 23 It depicts an explanatory diagram showing a specific evaluation example of the utility of an area in an auction after an optimal mission is generated.

FIG. 22 is an explanatory diagram showing a specific evaluation example of the utility of the area when the optimal mission is generated. FIG. 23 is an explanatory diagram showing a specific evaluation example of the utility of the area during an auction thereafter.

FIG. 22 shows that there are mission candidates M1 to M4 for the two target tasks corresponding to the delivery destinations d1 and d2 of the business operator having two bases (s1 and s2), and the mission M1 is selected among them as the optimal mission. The example in FIG. 22 shows the arrival time limit of the task corresponding to the delivery destination d1=50, reward=100, and the arrival time limit of the task corresponding to the delivery destination d2=20, reward=100.

In addition, the task assignment in the mission M1 is the first task: s1-d1 and the second task: s2-d2, mission reward=(100+100)=200, and mission cost=((10+0)+(15+0))=25. Thus, the mission utility is calculated as u(M1)=200−25=175.

In addition, the task assignment in the mission M2 is the first task: s2-d1 and the second task: s2-d2, mission reward=(100+100)=200, and mission cost=((40+0)+(15+0))=55. Thus, the mission utility is calculated as u(M2)=200−55=145.

In addition, the task assignment in the mission M3 is the first task: s1-d1 and the second task: s1-d2 (however, the second task cannot make arrival), mission reward=(100+0)=100, and mission cost=((10+0)+(N/A)=10. Thus, the mission utility is calculated as u(M3)=100−10=90.

In addition, the task assignment in the mission M4 is the first task: s3-d1 and the second task: s1-d2 (however, the second task cannot make arrival), mission reward=(100+0)=100, and mission cost=((40+0)+(N/A)=40. Thus, the mission utility is calculated as u(M4)=100−40=60. From the above results, the MP 10A outputs the mission M1 as the optimal mission.

FIG. 23 is an explanatory diagram showing a specific evaluation example of the utility of the area when the price of the path p1 for the first task becomes 32 as a result of applying for the operation plan for the path for each task included in the mission M1 and repeating bids. In the case of this example, in step a104, the utility of the area R1 included in the path p1, which is the interference area with another business operator, is calculated as follows based on the utility of the mission M1 using the area and the utility of the mission M2 not using the area.

First, from the updated mission cost=((10+32)+(15+0))=57, the utility of the mission M1 is u(M1)=200−57=143. Thus, the utility of the area R1 is calculated as f(R1)=143−145=−2. Since the utility f(R1) of the area R1 is less than 0, no further bid is made for the path p1.

In this example, the process then returns to a111, and the MP 10A reselects the mission M2 as the optimal mission based on the updated mission utility.

Figure 24:
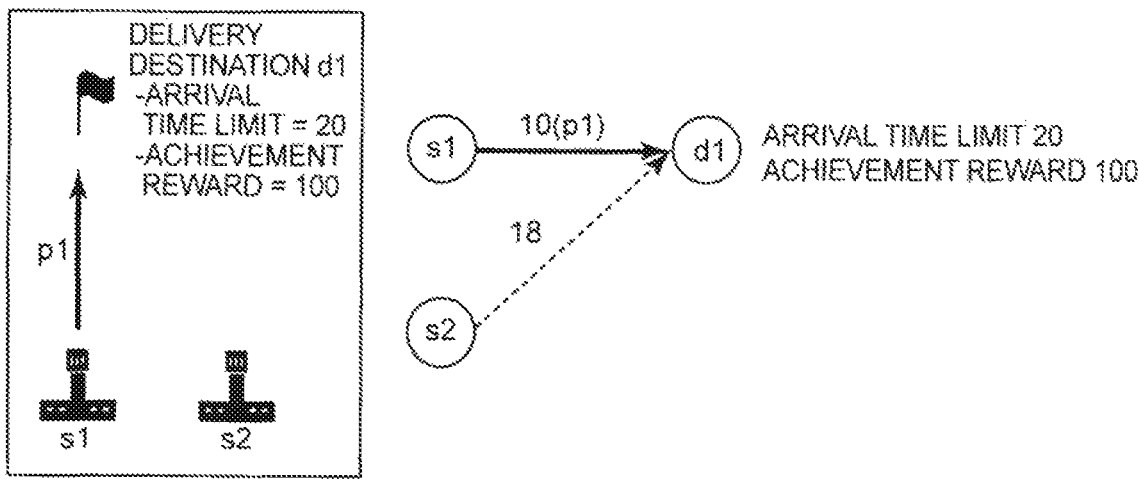
FIG. 24 It depicts an explanatory diagram (1) showing an example of revising an optimal mission during an auction.

FIGS. 24 to 26 are explanatory diagrams showing another example of revising the optimal mission during an auction. FIG. 24 is an explanatory diagram showing an example of the optimal mission at the first planning. FIG. 25 is an explanatory diagram showing an example of the optimal mission at the second planning after receiving the bid result of the first optimal mission. FIG. 26 is an explanatory diagram showing an example of the optimal mission at the third planning after receiving the bid result of the second optimal mission. Note that, FIGS. 24 to 26 show an example in which the number of target tasks is one to simplify the explanation. The target task in this example is the delivery destination d1, arrival time limit=20, and achievement reward=100.

In this example, it is assumed that the MP 10A firstly assigns the delivery to the delivery destination d1 from the base s1 with the path p1. At this time, task assignment: s1-d1, path p1, path cost=10 (arrival time=10, path price=0). Thus, the mission utility is calculated as 100−10=90 (see FIG. 24).

As a result of the bid for the optimal mission, it is assumed that the price of the path p1 is increased to 15 and the mission utility becomes 100−(10+15)=75. Since the price of path p1 is increased, the MP 10A changes the path for the task assignment s1-d1 to path p2 (revises the optimal mission). The arrival time of the path p2 is 13, and the utility of the mission before the bid is 100−13=87.

The operation-plan application unit 50A applies for the operation plan for the revised optimal mission (see FIG. 25). For comparison, FIG. 25 shows the updated utility and the like of the mission corresponding to the path p1 based on the bid result of the path.

As a result of the bid for the optimal mission, it is assumed that the price of the path p2 is increased to 7 and the utility of the mission becomes 100−(13+87)=80. Since the price of path p2 is increased, the MP 10A changes the delivery base for d1 to s2 with which the delivery can be executed at a lower cost (path p3) (revises the optimal mission). At this time, the arrival time of the path p3 for s2-d1 is 18, and the utility of the mission before the bid is 100−18=82.

The operation-plan application unit 50A applies for the operation plan for the revised optimal mission (see FIG. 26). For comparison, FIG. 26 further shows the updated utility and the like of the mission corresponding to the path p2 based on the bid result of the path.

As a result of the bid for the optimal mission, it is assumed that the path p3 is reserved with the price=1, and the utility of the mission becomes 100−(18+1)=81.

In such a case, for example, the area evaluation unit 40A can calculates the utility f(R1) of the area R1 included only in the path p1 as the utility of the mission including the area−the maximum utility of the mission not including the area=75−81=−6. Similarly, the utility f(R2) of the area R2 included only in the path p2 can be calculated as the utility of the mission including the area−the maximum utility of the mission not including the area=80−81=−1. Similarly, the utility f(R3) of the area R3 included only in the path p3 can be calculated as the utility of the mission including the area−the maximum utility of the mission not including the area=81−80=1.

b. (Negotiation System)

Next, an area evaluation example when an area is negotiated with other business operators. With this, when the path price is changed by negotiation, the negotiation price can be calculated appropriately. In the example described below, an area is negotiated when an operation plan is applied for. However, the same can be done during operation.

Figure 27:
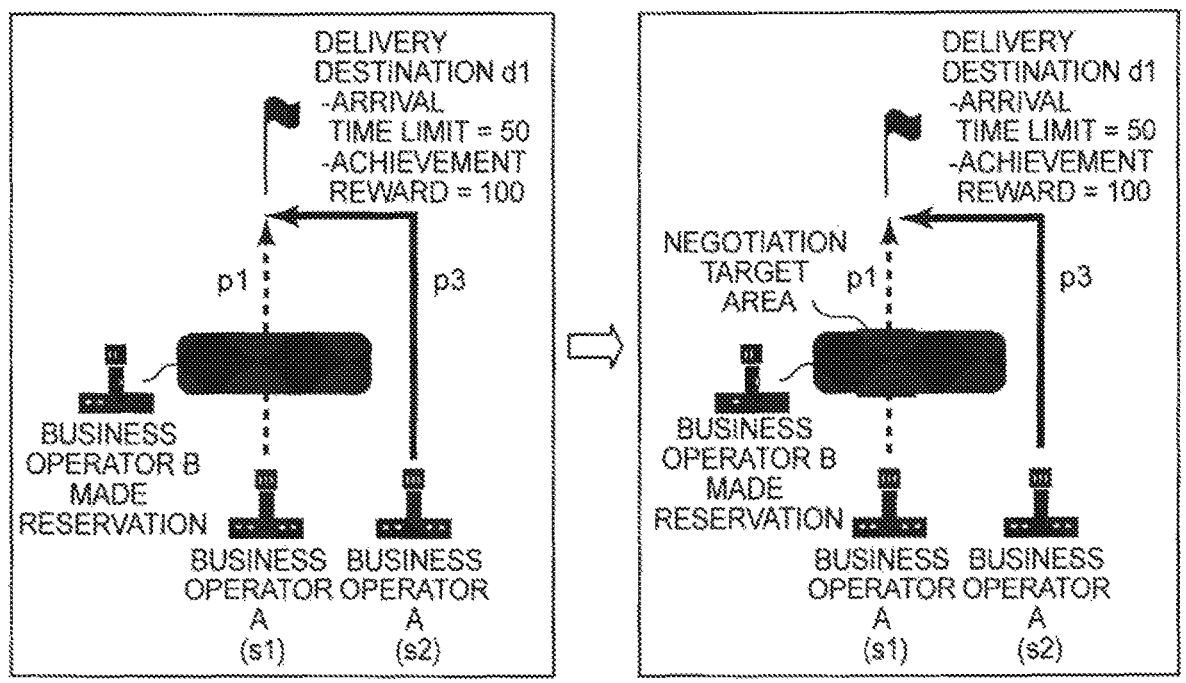
FIG. 27 It depicts an explanatory diagram showing an example of a negotiation target area.

FIG. 27 is an explanatory diagram showing an example of a negotiation target area. In the above example, as shown in FIG. 27, when there is no solution from the base s1 to the delivery destination d1 due to the area reserved by the business operator B while the business operator A is generating an optimal mission, the MP 10A performs task assignment to the path p3 for the delivery from the base s2. However, if the utility of the mission can be increased by using the path p1 for the delivery from the base s1, negotiation may be conducted with the business operator B to transfer the right of the area on the path p1.

In that case, the business operator who offers negotiation may negotiate with the other business operator if the utility of the area reserved by the other business operator is equal to or greater than the threshold. At this time, the area R, which is the negotiation target area, is an area on the path included in the mission or mission candidate of the own business operator and may be reserved by another business operator (an interference area). In the following, the method for calculating the utility of the negotiation target area R and the method for calculating the utility of the negotiation related to the negotiation target area R are described.

Utility $f(R)$ of negotiation target area $R$=(utility of a mission using the area $R$)−(utility of a mission not using the area $R$)

Utility $g(R)$ of negotiation related to area $R$=$f(R)$ (b1)

For example, the business operator who offers negotiation determines the negotiation target area and the price thereof so as to increase the utility of the negotiation as shown above.

On the other hand, the business operator who receives the negotiation may evaluate the utility of the negotiation target area and accept the negotiation if the utility of the area is equal to or less than the threshold.

Utility $g(R)$ of negotiation related to area $R$=$-f(R)$ (b2)

For example, if the utility of the negotiation target area is equal to or greater than the threshold, that is, the utility of the negotiation is less than the threshold, the business operator who receives the negotiation may reject the negotiation or present the negotiation price in a manner such that the utility of the area is equal to or less than the threshold, that is, the utility of the negotiation is equal to or greater than the threshold.

In any case, the method for calculating the utility of the negotiation target area R (of the business operator who offers negotiation and the business operator who receives the negotiation) is similar to the above expression (1).

Figure 28:
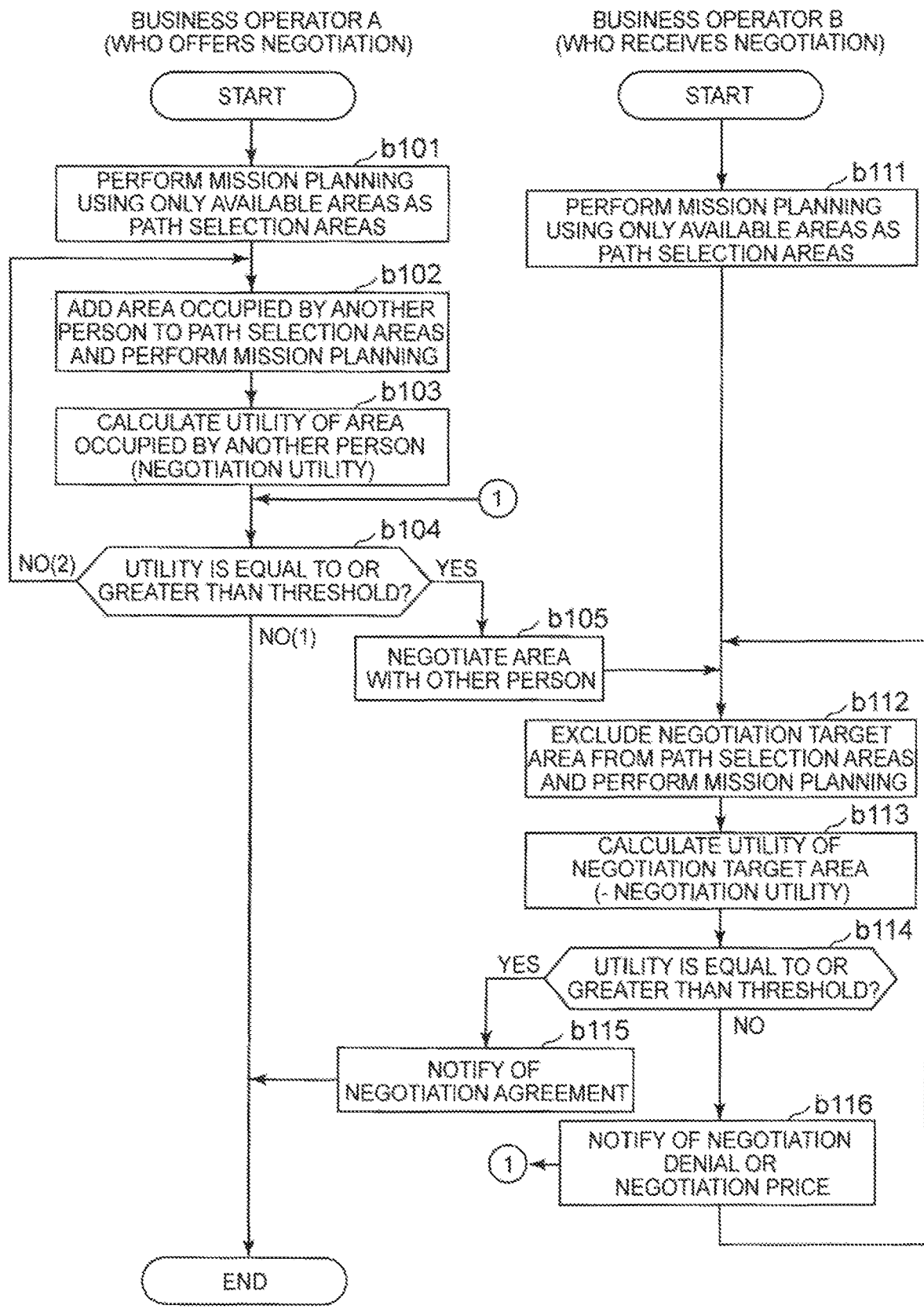
FIG. 28 It depicts a flowchart showing an operation example of the mission management system 100A when an area is reserved by negotiation.

FIG. 28 is a flowchart showing an operation example of the mission management system 100A when the area is reserved by negotiation. In the example shown in FIG. 28, first, the MP 10A of the business operator A (who offers negotiation later) performs mission planning using only its own available areas as path selection areas (step b101).

Then, the MP 10A of the business operator A performs mission planning using its available areas added with the area occupied by another person as the path selection areas (step b102).

Then, the area evaluation unit 40A of the business operator A calculates the utility of the area occupied by the other person (utility of negotiation) (step b103). At this time, the area evaluation unit 40A may calculate the utility including the negotiation price.

If the calculated utility of the negotiation target price is equal to or greater than the threshold (Yes in step b104), the negotiation unit 60A negotiates the area as the negotiation target area with the other person (the other business operator who keeps the occupied area for which the utility is calculated) (step b105). On the other hand, if the calculated utility of the negotiation target price is less than the threshold, the process returns to step b102, and the MP 10A further revises the mission by adding another area occupied by another person (No. (2) of step b104) or determines that there is no solution to simply terminate the process (No. (1) of step b104).

It is assumed that the MP 10A of the business operator B who receives the negotiation has been performed mission planning using only its own available areas as path selection areas (step b111). It is also possible to perform step b111 after receiving the negotiation.

Next, the MP 10A of the business operator B performs mission planning using the areas excluding the negotiation target area from its own available areas as the path selection areas (step b112).

Then, the area evaluation unit 40A of the business operator B calculates the utility of the negotiation target area (−negotiation utility) (step b113). At this time, the area evaluation unit 40A may calculate the utility including the negotiation price.

If the calculated utility of the negotiation target price is equal to or greater than the threshold (Yes in step b114), the negotiation unit 60A of the business operator B agrees to the negotiation for the area and notifies the business operator A who has offered the negotiation of the agreement (step b115). Alternatively, if the calculated utility of the negotiation target price is equal to or greater than the threshold (No in step b114), the negotiation unit 60A notifies that the negotiation is denied or of a new negotiation price (step b116). Note that, the business operator B may shift to a state of waiting for further negotiation after step b116.

The steps b101 and b102 may be performed reversely or may be combined into one to simultaneously perform the calculation.

The negotiation may be conducted directly with the negotiation partner or may be conducted via a coordinator that is a third party (for example, the area management system 200). In addition, the negotiation price of the negotiation target area is reflected in the price of the area and the moving cost of the path in the above description.

Figure 29:
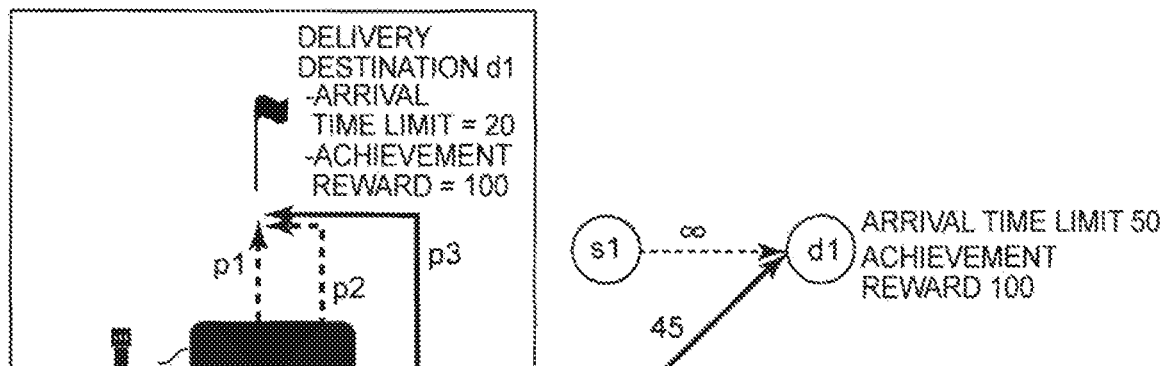
FIG. 29 It depicts an explanatory diagram showing an evaluation example of the utility of an area before negotiation.

FIG. 29 is an explanatory diagram showing an evaluation example of the utility of the area before negotiation, and FIG. 30 is an explanatory diagram showing an evaluation example of the utility of the area during negotiation.

Note that, FIGS. 29 and 30 show an example in which the number of target tasks is one to simplify the explanation. The target task in this example is the delivery destination d1, arrival time limit=50, and achievement reward=100.

In this example, the MP 10A of the business operator A determines the path p3 for the delivery from the base s2 to the delivery destination d1 as the optimal mission since there is no solution from the base s1 to the delivery destination d1 due to the area reserved by the business operator B. FIG. 29 shows that there are three path candidates (mission candidates) p1 to p3 for one target task corresponding to the delivery destination d1 of the business operator A having two bases (s1 and s2) and that the path p3 is selected among them as the optimal mission.

The task assignment for the path p1 is s1-d1, mission reward=100, mission cost (moving cost)=(10+∞)=∞, and the mission utility is 0. The task assignment for the path p2 is s1-d1, mission reward=100, mission cost=(20+∞)=∞, and the mission utility is 0. The task assignment for the path p3 is s2-d1, mission reward=100, mission cost=(40+5)=45, and the mission utility is 55. Note that, the moving cost of the path p3 reflects the path price of the bid for the operation plan.

Before the negotiation, the area evaluation unit 40A can calculates the utility f(R1) of the area R1 included only in the path p1 as the utility of the mission including the area−the maximum utility of the mission not including the area=0−55=−55. Similarly, the utility f(R2) of the area R2 included only in the path p2 can be calculated as the utility of the mission including the area−the maximum utility of the mission not including the area=0−55=−55. Similarly, the utility f(R3) of the area R3 included only in the path p3 can be calculated as the utility of the mission including the area−the maximum utility of the mission not including the area=55−0=55.

In this case, since the mission utility can be increased by performing the delivery to the delivery destination d1 using the path p1 from the base s1, the business operator A may negotiate, with the business operator B, the area on the path p1 among the areas reserved by the business operator B as the negotiation target area to transfer the right.

FIG. 30 shows the calculation expressions for the moving cost (mission cost) and the mission utility for the paths p1 and p2 when the negotiation price is x, and specific examples thereof. For example, when the path p1 as the negotiation price x=1 is negotiated, the utility of the area (utility of the negotiation) is 89−55=34 (≥0). If the negotiation is concluded, the mission utility is 89. However, for example, when the business operator B returns the negotiation price=40 for the offer of the negotiation price=1, the utility of the area (utility of the negotiation) is 50−55=−5 (<0). In this case, the business operator A abandons the use of the path p1 and does not conclude the negotiation, and may newly negotiate an area on another path.

For example, the negotiation unit 60A of the business operator A may negotiate the area R2 on the path p2 since the negotiation for the path p1 has not been concluded. For example, when the area R2 on the path p2 as the negotiation price x=3 is negotiated, the utility of the area (utility of the negotiation) is 77−55=22 (≥0). If the business operator that has been received the negotiation (the business operator B) agrees on the negotiation price, the negotiation is concluded, and the delivery from the base s1 can be executed by using the path p2.

In addition, for example, it is assumed that the area R2 on the path p2 as the negotiation price x=1 is negotiated, but the negotiation price=28 is returned from the other party. In this case, the utility of the area (utility of the negotiation) is 52−55=−3 (<0). In this case, the business operator A abandons the use of the path p2, does not conclude the negotiate, and performs the delivery using the original path p3.

Other Exemplary Embodiments

Note that, in the above, the evaluation examples of various areas have been described using a delivery task as an example, but the area evaluation method of the present invention is not limited to the area to be used for the delivery task. Other examples include tasks for patrolling a route or following a target for security and crime prevention, for comprehensively operating a target area for surveying and inspection, for comprehensively operating a target area for disaster response (grasping the damage situation, searching for victims, and the like), for comprehensively operating a target area for agricultural purposes (spraying pesticides, measuring the state of planting, and the like), for following a target or multi-angle photographing for news, entertainment, or sports, and for transporting people using commercial vehicles, such as personally driven vehicles, taxis, buses, and the like, ships, and drone taxis, and the like.

c. (Task for Comprehensively Operating Target Area)

For example, the mission planning unit 10 or the MP 10A may assign, as a result of assigning one or more moving body resources to each target area, moving body resources in a manner such that the mission utility (sum of coverage times for the areas, the maximum value) is minimized. At that time, the path planning unit 20 or the PP 20A may derive the path in a manner such that the moving cost is the minimum using, for example, moving cost=area coverage time.

In addition, when negotiation is received, by calculating the mission utility from the moving cost when the route related to the negotiation target area is changed and comparing with the mission utility before the route is changed, the utility of the area may be calculated. For example, the route can be changed in a manner such that the negotiation target area is released for a certain period of time and other areas are monitored during that time period. In addition, depending on the situation, by dividing the target area, the moving bodies are assigned individually.

Figure 31:
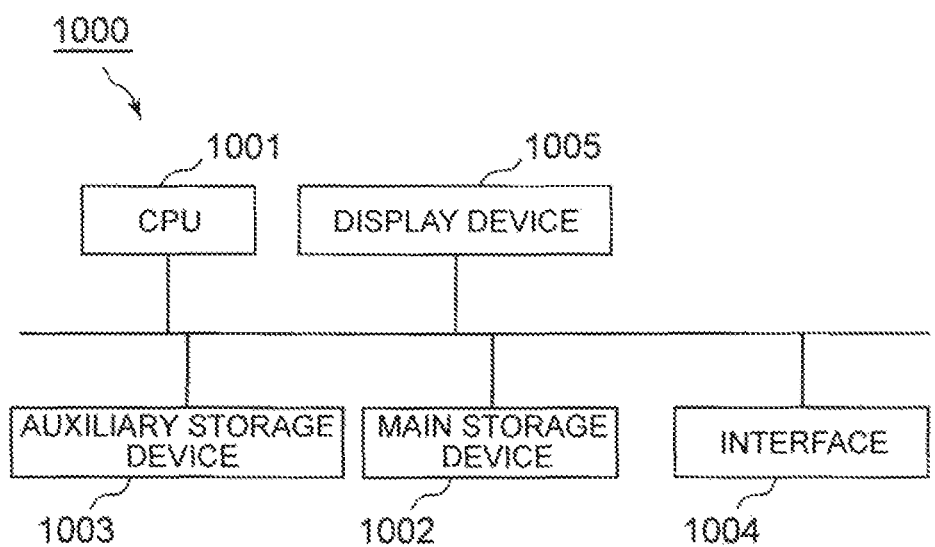
FIG. 31 It depicts a schematic block diagram showing a configuration example of a computer according to each exemplary embodiment of the present invention.

FIG. 31 is a schematic block diagram showing a configuration example of a computer according to each exemplary embodiment of the present invention. A computer 1000 includes a CPU 1001, a main storage device 1002, an auxiliary storage device 1003, an interface 1004, a display device 1005, and an input device 1006.

The server and other devices included in the system in each exemplary embodiment described above may be installed in the computer 1000. In that case, the operation of each device may be stored in the auxiliary storage device 1003 in the form of a program. The CPU 1001 loads the program from the auxiliary storage device 1003, develops the program in the main storage device 1002, and executes, in accordance with the program, a predetermined process in each exemplary embodiment. The CPU 1001 is an example of an information processing device that operates in accordance with the program and may include, and a micro processing unit (MPU), a memory control unit (MCU), a graphics processing unit (GPU), or the like may be provided in addition to the central processing unit (CPU), for example.

The auxiliary storage device 1003 is an example of a non-transitory tangible medium. Other examples of non-transitory tangible mediums include a magnetic disk, a magneto-optical disk, a CD-ROM, a DVD-ROM, a semiconductor memory, and the like which are connected via the interface 1004. Furthermore, when this program is distributed to the computer 1000 through a communication line, the computer 1000 receiving the distribution may develop the program in the main storage device 1002 and execute a predetermined process in each exemplary embodiment.

The program may be for implementing a part of the predetermined process in each exemplary embodiment. Furthermore, the program may be a differential program that implements the predetermined process in each exemplary embodiment in combination with another program already stored in the auxiliary storage device 1003.

The interface 1004 transmits/receives information to/from other devices. The display device 1005 presents information to the user. The input device 1006 receives input of information from the user.

In addition, depending on the processing content in the exemplary embodiment, some elements of the computer 1000 can be omitted. For example, the display device 1005 can be omitted if the computer 1000 does not present information to the user. For example, the input device 1006 can be omitted if the computer 1000 does not receive information input from the user.

In addition, a part of or all of the constituent elements of each exemplary embodiment are implemented by a general purpose or dedicated circuitry, a processor, or the like, or a combination thereof. These may be constituted by a single chip, or by a plurality of chips connected via a bus. A part of or all of the constituent elements of each exemplary embodiment may be implemented by a combination of the above circuitry or the like and a program.

In the case in which a part of or all of the constituent elements of each exemplary embodiment are implemented by a plurality of information processing devices, circuitries, or the like, the information processing devices, circuitries, or the like may be arranged in a concentrated manner, or dispersedly. For example, the information processing devices, circuitries, or the like may be implemented as a form in which each is connected via a communication network, such as a client-and-server system or a cloud computing system.

Figure 32:
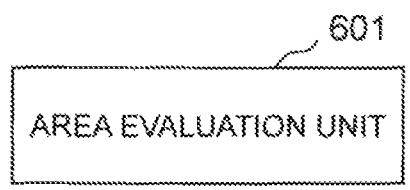
FIG. 32 It depicts a block diagram showing an outline of the area evaluation system according to the present invention.

Next, an outline of the present invention will be described. FIG. 32 is a block diagram showing an outline of the area evaluation system of the present invention.

The area evaluation system shown in FIG. 32 includes an area evaluation unit 601.

The area evaluation unit 601 (for example, the area evaluation unit 40) evaluates, when a first mission that uses a first area and a second mission that does not use the first area are provided, the utility of the first area based on a difference between the utility of the first mission and the utility of the second mission.

With this configuration, when there is interaction with another business operator for the area to be used for operation, the own business operator can appropriately evaluate the area. Consequently, it is possible not to make a disadvantage selection.

The above exemplary embodiments can be described as the following supplementary notes.

(Supplementary note 1) An area evaluation system comprising an area evaluation unit configured to evaluate, when a first mission that uses a first area and a second mission that does not use the first area are provided, utility of the first area based on a difference between utility of the first mission and utility of the second mission.

(Supplementary note 2) The area evaluation system according to Supplementary note 1, wherein each of the first mission and the second mission is a mission whose utility has an optimal value among missions generated under a condition of generating the mission.

(Supplementary note 3) The area evaluation system according to Supplementary note 1 or 2, wherein each of the first mission and the second mission is a mission derived, for one or more tasks provided in the mission, in a manner such that utility of the mission has an optimal value based on a result of assigning one or more moving body resources and a result of deriving a path for each moving body resource indicated by the assignment result.

(Supplementary note 4) The area evaluation system according to any one of Supplementary notes 1 to 3, wherein the first area is an area before operation.

(Supplementary note 5) The area evaluation system according to any one of Supplementary notes 1 to 3, wherein the first area is an area during operation.

(Supplementary note 6) The area evaluation system according to any one of Supplementary notes 1 to 5, wherein the first area is an area to be exchanged with an unspecified person.

(Supplementary note 7) The area evaluation system according to any one of Supplementary notes 1 to 5, wherein the first area is an area to be exchanged with a specified person.

(Supplementary Note 8) The area evaluation system according to any one of Supplementary notes 1 to 7, wherein the first area is an area owned by any person.

(Supplementary note 9) The area evaluation system according to any one of Supplementary notes 1 to 7, wherein the first area is an area not owned by any person.

(Supplementary note 10) The area evaluation system according to any one of Supplementary notes 1 to 9, further comprising:

a mission planning unit configured to assign, when one or more tasks involving operation of a moving body and each including designation of a space and time are provided, one or more moving body resources that are designated a specific operation condition to generate a mission; and a path planning unit configured to derive, when the mission planned by the mission planning unit is provided, a path for each of the moving body resources included in the mission, wherein the area evaluation unit is configured to evaluate, in two missions included in two or more missions, the two or more missions being generated by the mission planning unit, for which paths are derived by the path planning unit, utility of at least a part of an area that is used in one mission but is not used in the other mission, based on a difference between the utility of the first mission that is the one mission and the utility of the second mission that is the other mission.

(Supplementary note 11) The area evaluation system according to Supplementary note 10, wherein the moving body resources assigned by the mission planning unit each include at least one designation of a start point, a start time, one or more points including a target range or a goal point, an allowable time until completion of execution, and an operation executable area.

(Supplementary note 12) The area evaluation system according to Supplementary note 10 or 11, wherein utility of a mission is determined based on economic or business utility of the tasks provided in the mission and moving costs of the moving body resources included in the mission.

(Supplementary Note 13) An area evaluation method comprising evaluating by an information processing device, when a first mission that uses a first area and a second mission that does not use the first area are provided, utility of the first area on the basis of a difference between utility of the first mission and utility of the second mission.

(Supplementary Note 14) A computer-readable recording medium storing an area evaluation program for causing a computer to evaluate, when a first mission that uses a first area and a second mission that does not use the first area are provided, utility of the first area based on a difference between utility of the first mission and utility of the second mission.

The present invention has been described with reference to the exemplary embodiments and examples, but is not limited to the above exemplary embodiments and examples. Various changes that can be understood by those skilled in the art within the scope of the present invention can be made to the configurations and details of the present invention.

INDUSTRIAL APPLICABILITY

The present invention is not limited to operation plans of UAVs, but is also applicable to vehicle allocation plans or route plans for business operators of automatic delivery trucks and the like and to path reserving for switching traveling lanes when a traveling autonomous vehicle changes lanes or turns left or right.

REFERENCE SIGNS LIST

100 Area evaluation system
10 Mission planning unit
20 Path planning unit
30 Moving body
40 Area evaluation unit
300A UAV traffic management system (UTMS)
200 Area management system
100A Mission management system
10A Mission planner (MP)
20A Path planner (PP)
40A Area evaluation unit
50A Operation-plan application unit
60A Negotiation unit
601 Area evaluation unit
1000 Computer
1001 CPU
1002 Main storage
1003 Auxiliary storage
1004 Interface
1005 Display device
1006 Input device

The invention claimed is:

1. An area evaluation system comprising:
a processor; and
a memory storing a program code executable by the processor to:
receive a first mission including a plurality of first tasks performable by a plurality of first moving bodies of a first operator within a first space;
receive a second mission including a plurality of second tasks performable by a plurality of second moving bodies within a second space;
in response to determining that the first space of the first mission includes a first area that is not part of the second space of the second mission, evaluate, utility of the first area based on a difference between utility of the first mission and utility of the second mission, the first area subject to transfer of usage rights between a first operator of the first moving bodies and a second operator of the second moving bodies;
select a target mission for the plurality of first moving bodies based on the utility of the first area that has been evaluated; and
cause the first moving bodies to perform the target mission.

2. The area evaluation system according to claim 1, wherein
the utility of each of the first mission and the second mission has an optimal value among a plurality of missions generated under a specified condition.

3. The area evaluation system according to claim 1, wherein
the first mission is a derived for the first tasks, such that the optimal value of the utility of the first mission is based on a result of assigning the first moving bodies and a result of deriving a path for each first moving body, and
the second mission is derived for the second tasks, such that the optimal value of the utility of the second mission is based on a result of assigning the second moving bodies and a result of deriving a path for each second moving body.

4. The area evaluation system according to claim 1, wherein
the first area is an area before operation.

5. The area evaluation system according to claim 1, wherein
the first area is an area during operation.

6. The area evaluation system according to claim 1, wherein
the first area is an area controlled by an unspecified person.

7. The area evaluation system according to claim 1, wherein
the first area is an area controlled by a specified person.

8. The area evaluation system according to claim 1, wherein
the first area is an area owned by any person.

9. The area evaluation system according to claim 1, wherein
the first area is an area not owned by any person.

10. The area evaluation system according to claim 1, wherein the program code is executable by the processor to further:
assign, when one or more tasks involving operation of a moving body and that each include designation of a space and time are provided, one or more moving body resources that are designated by a specific operation condition, to generate a mission;
derive, when the mission is provided, a path for each of the moving body resources included in the mission; and
evaluate, in two missions included in two or more missions, utility of at least a part of an area that is used in a first mission of the two missions but is not used in a second mission of the two missions, based on a difference between utility of the first mission and utility of the second mission.

11. The area evaluation system according to claim 10, wherein
the moving body resources each include at least one designation of a start point, a start time, one or more points including a target range or a goal point, an allowable time until completion of execution, and an operation executable area.

12. The area evaluation system according to claim 10, wherein
the utility of each mission of the first mission and the second mission is determined based on economic or business utility of the tasks provided in the mission and moving costs of the moving body resources included in the mission.

13. An area evaluation method comprising:
receiving, by a processor, a first mission including a plurality of first tasks performable by a plurality of first moving bodies of a first operator within a first space;
receiving, by the processor, a second mission including a plurality of second tasks performable by a plurality of second moving bodies within a second space;
in response to determining that the first space of the first mission includes a first area that is not part of the second space of the second mission, evaluating, by the processor, utility of the first area based on a difference between utility of the first mission and utility of the second mission, the first area subject to transfer of usage rights between a first operator of the first moving bodies and a second operator of the second moving bodies;
selecting, by the processor, a target mission for the plurality of first moving bodies based on the utility of the first area that has been evaluated; and
causing, by the processor, the first moving bodies to perform the target mission.

14. A non-transitory computer-readable recording medium storing an area evaluation program executable by a computer to:
receive a first mission including a plurality of first tasks performable by a plurality of first moving bodies of a first operator within a first space;
receive a second mission including a plurality of second tasks performable by a plurality of second moving bodies within a second space;
in response to determining that the first space of the first mission includes a first area that is not part of the second space of the second mission, evaluate, utility of the first area based on a difference between utility of the first mission and utility of the second mission, the first area subject to transfer of usage rights between a first operator of the first moving bodies and a second operator of the second moving bodies;
select a target mission for the plurality of first moving bodies based on the utility of the first area that has been evaluated; and
cause the first moving bodies to perform the target mission.

* * * * *